United States Patent
Ide et al.

(10) Patent No.: US 11,015,131 B2
(45) Date of Patent: May 25, 2021

(54) MANUFACTURING HYDROCARBONS

(71) Applicant: ExxonMobil Research and Engineering Company, Annandale, NJ (US)

(72) Inventors: Matthew S. Ide, Doylestown, PA (US); Suzzy C. Ho, Princeton, NJ (US); Guang Cao, Princeton, NJ (US); Brian M. Weiss, Bridgewater, NJ (US); Sara L. Yohe, Houston, TX (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 44 days.

(21) Appl. No.: 16/541,297

(22) Filed: Aug. 15, 2019

(65) Prior Publication Data
US 2020/0063043 A1    Feb. 27, 2020

Related U.S. Application Data

(60) Provisional application No. 62/721,157, filed on Aug. 22, 2018.

(51) Int. Cl.
| | |
|---|---|
| *C10G 67/02* | (2006.01) |
| *C10G 47/02* | (2006.01) |
| *C10G 50/02* | (2006.01) |
| *B01J 31/18* | (2006.01) |

(52) U.S. Cl.
CPC ............ *C10G 67/02* (2013.01); *B01J 31/183* (2013.01); *C10G 47/02* (2013.01); *C10G 50/02* (2013.01); *C10G 2400/10* (2013.01); *C10G 2400/20* (2013.01); *C10G 2400/22* (2013.01)

(58) Field of Classification Search
CPC ........ C10G 67/02; C10G 47/02; C10G 50/02; C10G 2400/22; C10G 2400/10; C10G 2400/20; B01J 31/183; B01J 2531/842; B01J 2231/20; B01J 31/1815
See application file for complete search history.

(56) References Cited

U.S. PATENT DOCUMENTS

| | | |
|---|---|---|
| 4,153,638 A | 5/1979 | Bercik et al. |
| 4,417,082 A | 11/1983 | Larkin et al. |
| 4,551,438 A | 11/1985 | Miller |
| (Continued) | | |

FOREIGN PATENT DOCUMENTS

| | | |
|---|---|---|
| DE | 102006039904 A1 | 2/2008 |
| EP | 276096 A1 | 7/1988 |
| (Continued) | | |

*Primary Examiner* — Randy Boyer
*Assistant Examiner* — Juan C Valencia
(74) *Attorney, Agent, or Firm* — Robert A. Migliorini

(57) ABSTRACT

A system and methods for manufacturing a base oil stock from a light hydrocarbon stream are provided. An example method includes cracking a light hydrocarbon stream to form an impure olefinic stream, separating water from the impure olefinic stream, and oligomerizing the impure olefinic stream to form a raw oligomer stream. A light olefinic stream from the raw oligomer stream and linear alpha olefins are recovered from the light olefinic stream. A heavy olefinic stream is distilled from the raw oligomer stream and hydro-processed to form a hydro-processed stream. They hydro-processed stream is distilled to form the base oil stock.

16 Claims, 13 Drawing Sheets

(56) References Cited

U.S. PATENT DOCUMENTS

| | | |
|---|---|---|
| 4,855,526 A | 8/1989 | Hen |
| 4,897,245 A | 1/1990 | Hsia et al. |
| 4,899,014 A | 2/1990 | Avidan et al. |
| 4,899,015 A | 2/1990 | Harandi et al. |
| 4,942,021 A | 7/1990 | Garwood et al. |
| 4,956,514 A | 9/1990 | Chu |
| 4,973,790 A | 11/1990 | Beech, Jr. et al. |
| 5,004,852 A | 4/1991 | Harandi |
| 5,019,357 A | 5/1991 | Harandi et al. |
| 5,223,472 A * | 6/1993 | Simpson ............... B01J 21/04 |
| | | 502/314 |
| 5,271,835 A * | 12/1993 | Gorawara ............ C10G 70/00 |
| | | 208/203 |
| 5,321,190 A | 6/1994 | Aufdembrink et al. |
| 5,960,643 A | 10/1999 | Kuechler et al. |
| 6,111,156 A | 8/2000 | Oballa et al. |
| 6,124,513 A | 9/2000 | Heilman et al. |
| 6,212,905 B1 | 4/2001 | Kuechler et al. |
| 6,262,324 B1 | 7/2001 | Heilmann et al. |
| 6,388,148 B2 | 5/2002 | Heilmann et al. |
| 6,417,416 B1 | 7/2002 | Heilman et al. |
| 6,441,263 B1 | 8/2002 | O'Rear et al. |
| 6,586,646 B1 | 7/2003 | Heilman et al. |
| 6,660,894 B1 | 12/2003 | Wu et al. |
| 6,730,818 B2 | 5/2004 | Heilman et al. |
| 6,911,410 B2 | 6/2005 | Lecocq et al. |
| 6,951,831 B2 | 10/2005 | Lecocq et al. |
| 7,314,964 B2 | 1/2008 | Abrevaya et al. |
| 7,972,498 B2 | 7/2011 | Buchanan et al. |
| 7,989,668 B2 | 8/2011 | Godsmark et al. |
| 8,137,533 B2 | 3/2012 | Towler et al. |
| 8,173,855 B2 | 5/2012 | Kotter et al. |
| 8,481,451 B2 | 7/2013 | Kang et al. |
| 8,784,743 B2 | 7/2014 | Keusenkothen et al. |
| 2003/0220191 A1 | 11/2003 | Lecocq et al. |
| 2005/0101814 A1 | 5/2005 | Foley et al. |
| 2006/0173230 A1 | 8/2006 | Chang et al. |
| 2007/0090018 A1 | 4/2007 | Keusenkothen et al. |
| 2007/0090019 A1 | 4/2007 | Keusenkothen et al. |
| 2007/0112089 A1 | 5/2007 | Boelt et al. |
| 2010/0048968 A1 | 2/2010 | Lauritzen et al. |
| 2012/0071701 A1 | 3/2012 | Glover |
| 2012/0125811 A1 | 5/2012 | Bridges et al. |
| 2013/0158321 A1 | 6/2013 | Olivier-Bourbigou et al. |
| 2014/0275669 A1* | 9/2014 | Daage ...................... C07C 2/12 |
| | | 585/251 |
| 2015/0158786 A1* | 6/2015 | Mertens ................. B01J 20/08 |
| | | 585/518 |
| 2015/0218065 A1 | 8/2015 | Fritz et al. |

FOREIGN PATENT DOCUMENTS

| | | |
|---|---|---|
| EP | 2228355 A1 | 9/2010 |
| GB | 2435883 A | 9/2007 |
| KR | 10-1568859 B1 | 11/2015 |
| WO | 2011156892 A2 | 12/2011 |

\* cited by examiner

A

B

C

D

E

F

800

900

MANUFACTURING HYDROCARBONS

CROSS-REFERENCE TO RELATED APPLICATIONS

This application claims the benefit of U.S. Provisional Application No. 62/721,157, filed on Aug. 22, 2019, the entire contents of which are incorporated herein by reference.

FIELD

The techniques described herein provide systems and methods for manufacturing a lubricant base stock from a light hydrocarbon stream. The light hydrocarbon stream is processed in to generate a mixture of compounds that are oligomerized and hydro-processed to form the base oil stock.

BACKGROUND

This section is intended to introduce various aspects of the art, which may be associated with exemplary examples of the present techniques. This description is believed to assist in providing a framework to facilitate a better understanding of particular aspects of the present techniques. Accordingly, it should be understood that this section should be read in this light, and not necessarily as admissions of prior art.

High molecular weight paraffins suitable for the production of high quality hydrocarbon fluids, such as base oil stocks and distillate fuel, are typically in short supply or expensive to manufacture. In addition, the oligomerization of olefins is typically performed with high purity feed streams, such as polymer grade ethylene.

The production of higher molecular weight linear paraffins and isoparaffins, for example, to form base oil stocks, from hydrocarbon streams may involve numerous steps, which affect the costs for the final products. One example of the production of these compounds is the production of syngas, CO and $H_2$ by steam reforming of methane, followed by methanol synthesis. The methanol may then be converted to olefins via a methane-to-olefins (MTO) process. The olefins are further oligomerized to higher molecular weight hydrocarbons. In another example, syngas is produced for use in Fischer-Tropsch reactions which preferentially synthesize linear high molecular weight products. However, these options may be economically problematic due to the need to first produce syngas.

Some previous research activities have focused on using impure ethylene feeds to produce polyalphaolefins (PAOs). For example, U.S. Patent Application Publication No. 2010/0249474 by Nicholas et al. discloses a "process for oligomerizing dilute ethylene." As described in the publication, a fluid catalytic cracking process (FCC) may provide a dilute ethylene stream, as heavier hydrocarbons are processed. The ethylene in the dilute ethylene stream may be oligomerized using a catalyst, such as an amorphous silica-alumina base with a Group VIII or VIB metal that is resistant to feed impurities such as hydrogen sulfide, carbon oxides, hydrogen and ammonia. About 40 wt. %, or greater, of the ethylene in the dilute ethylene stream can be converted to heavier hydrocarbons.

Further, U.S. Patent Application Publication No. 2014/0275669 by Daage et al., discloses the "production of lubricant base oils from dilute ethylene feeds." As described in this publication, a dilute ethylene feed, for example, formed while cracking heavier hydrocarbons, may be oligomerized to form oligomers for use as fuels or lubricant base oils. The oligomerization of the impure dilute ethylene is performed with a zeolitic catalyst. The zeolitic catalyst is resistant to the presence of poisons such as sulfur and nitrogen in the ethylene feed. Diluents such as light paraffins, may be present without interfering with the process.

The feed used for both processes described above is derived from the processing of oil in a fluid catalytic cracker (FCC). In an FCC, heavier hydrocarbons, such as crude oil fractions with a molecular weight of about 200 to about 600, or higher, are contacted with a catalyst at high temperatures to form lower molecular weight compounds. The byproduct gases from the FCC include olefins that may be used to form the oligomers.

The oligomerization of blends of ethylene with co-monomers, such as 1-hexene, 1-heptene, 1-octene, 1-dodecene, and 1-hexadecene, has been explored. For example, U.S. Pat. No. 7,238,764 describes a process for the co-oligomerization of ethylene and alpha olefins. The co-oligomerization of the alpha olefins with ethylene is performed in the presence of a metal catalyst system. The metal catalyst system may include bis-aryliminepyridine $MX_a$ complexes, [bis-aryliminepyridine $MY_p.L_b^+$] $[NC^-]_q$ complexes, or both. The process is carried out in an ethylene pressure of less than about 2.5 megapascals (MPa).

SUMMARY

In an embodiment, the present invention provides a system for manufacturing a base oil stock from a light hydrocarbon stream. The system includes a cracker configured to form a raw hydrocarbon stream from the light hydrocarbon stream, a separator configured to separate a raw olefinic stream from the raw hydrocarbon stream, and an oligomerization reactor configured to increase a number of carbon atoms in molecules of the raw olefinic stream forming a raw oligomer stream. A distillation column is configured to separate a light olefinic stream from the raw oligomer stream for recovery of light linear alpha olefins. The distillation column is configured to further separate the raw oligomer stream into an intermediate olefinic stream and a heavy olefinic stream. A hydro-processing reactor is configured to hydro-process the heavy olefinic stream to form a hydro-processed stream. A product distillation column is configured to separate the hydro-processed stream to form the base oil stock.

In another embodiment, the present invention provides a method for manufacturing a base oil stock from a light hydrocarbon stream. The method includes cracking a light hydrocarbon stream to form an impure olefinic stream, separating water from the impure olefinic stream, and oligomerizing the impure olefinic stream to form a raw oligomer stream. A light olefinic stream is distilled from the raw oligomer stream and linear alpha olefins are recovered from the light olefinic stream. A heavy olefinic stream is distilled from the raw oligomer stream and hydro-processed to form a hydro-processed stream. The hydro-processed stream is distilled to form the base oil stock.

In another embodiment, the present invention provides a system for manufacturing a base oil stock from a light hydrocarbon stream. The system includes a steam cracker to form an impure olefinic stream from the light hydrocarbon stream, and a separator configured to remove naphtha, water, steam cracker gas oil (SCGO), and tar from the impure olefinic stream. An oligomerization reactor is configured to convert the impure olefinic stream to a higher molecular weight stream by contacting the impure olefinic stream with a homogeneous catalyst. A distillation column is configured to recover a light olefinic stream and provide the light olefinic stream to a recovery system for the recovery of light alpha olefins. The distillation column is configured to separate an intermediate olefinic stream from the higher molecular weight stream and send the intermediate olefinic stream to a dimerization reactor or an alkylation reactor. The distillation column is configured to separate a heavy olefinic stream from the higher molecular weight stream. A hydroprocessing reactor is configured to demetallate the heavy olefinic stream, to crack the heavy olefinic stream, to form isomers in the heavy olefinic stream, or to hydrogenate olefinic bonds in the heavy olefinic stream, or any combinations thereof. A product distillation column is configured to separate the isomers in the heavy olefinic stream to form a plurality of base oil stock streams.

DESCRIPTION OF THE DRAWINGS

The advantages of the present techniques are better understood by referring to the following detailed description and the attached drawings.

DETAILED DESCRIPTION

Figure 1A:
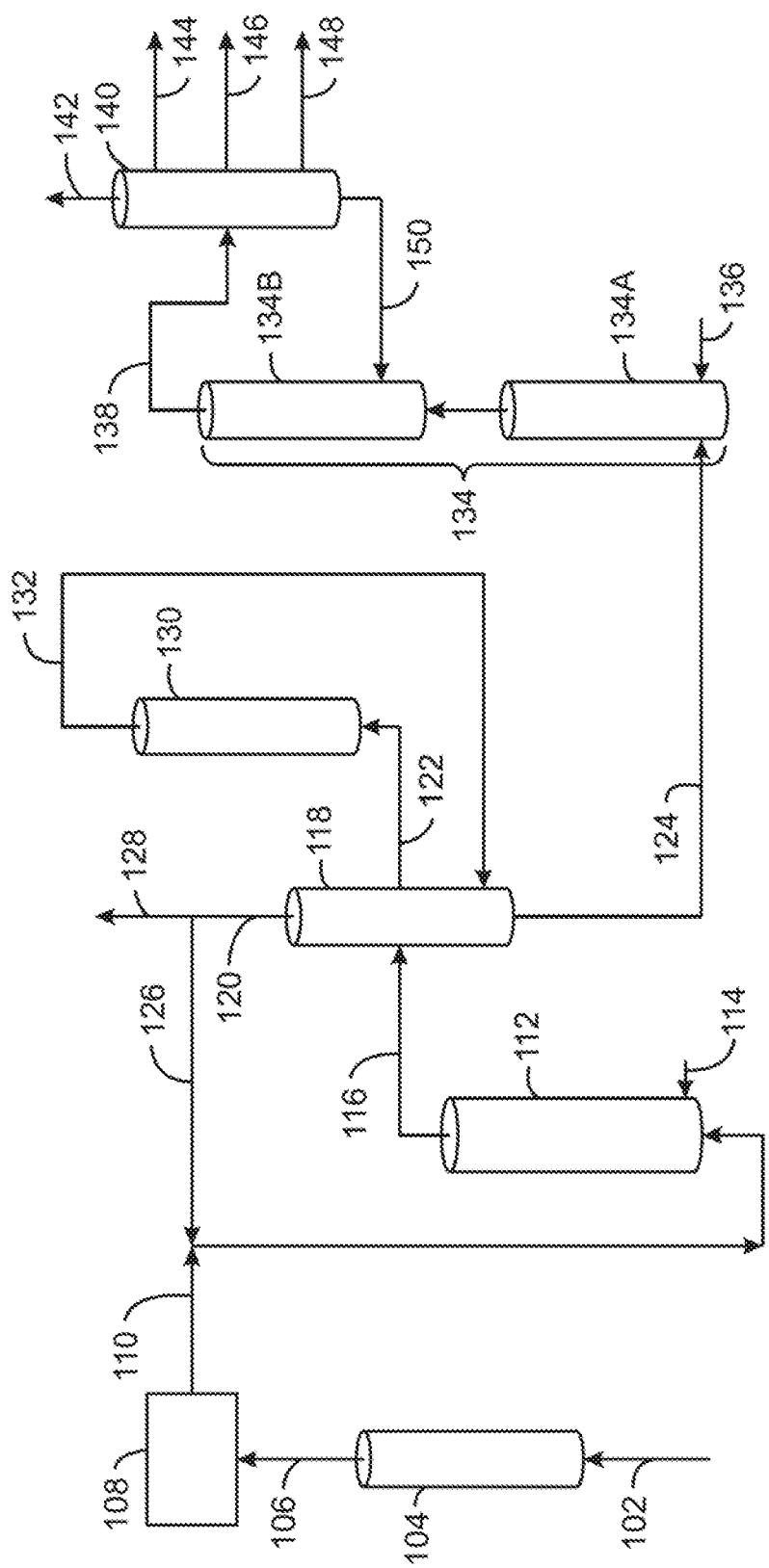
FIG. 1(A) is a simplified block diagram of a system for producing base oil stocks from a light feedstock, in accordance with examples.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

Recent improvements in the production of hydrocarbons, for example, the use of hydraulic fracturing and tertiary oil recovery techniques, have resulted in the increased availability of lower molecular weight hydrocarbons, termed light hydrocarbon streams herein. These include natural gas and natural gas liquids (NGL), which may include methane, ethane, propane, and butane, along with other hydrocarbon and heteroatom contaminants. The use of the lower molecular weight hydrocarbons as feedstocks for chemical processes may provide economic benefits. However, upgrading the lower molecular weight feedstocks to increase the molecular weight may pose challenges.

The techniques described herein disclose a method for producing high molecular weight molecules from a raw olefin stream that may include olefins, paraffins, hydrogen, and carbon monoxide. The raw olefin stream is provided by a steam cracking reactor, or cracker, which may be controlled to provide a higher molecular weight feed stock from a light hydrocarbon stream. The light hydrocarbon stream has an API gravity of at least 45, at least 50, at least 55, at least 60, at least 65, or at least 70 according to various embodiments of the present invention. Further, the hydrogen content of the starting raw hydrocarbons may be greater than or equal to 14%, or, in some examples, greater or equal to 16%. In some examples, the light hydrocarbon stream may also include compounds having two to four, two to six, two to 12, or two to 20 carbon atoms. In some examples, the feed is a natural gas liquids (NGL) stream. In other examples, the feed includes methane, ethane, propane, or butane. In some examples, the light hydrocarbon feedstock has an API gravity of between about 45 and 55 and includes molecules with carbon chains of about two to 25 carbon atoms in length, among others. In other examples, the light hydrocarbon feedstock has an API gravity of between about 55 and 65 and includes molecules with about two to 10 carbon atoms, among others. In other examples, the light hydrocarbon feedstock has an API gravity of between about 55 and 65 and includes molecules with about two to 10 carbon atoms, among others. In yet other examples, the light hydrocarbon feedstock has an API gravity of between about 65 and 75 and includes molecules with about two to five carbon atoms, among others.

The light hydrocarbon stream may be sourced from any number of hydrocarbon formations, including, for example, tight gas formations. These may include the Clinton, Medina, and Tuscarora formations in Appalachia, the Berea sandstone in Michigan, the Bossier, Cotton Valley, Olmos, Vicksburg, and Wilcox Lobo formations along the Gulf Coast, the Granite Wash and Atoka formations in the Mid-continent, the Canyon formation and other formations, in the Permian Basin, and the Mesaverde and Niobrara formations in multiple Rocky Mountain basins. Any number of other formations may be used to provide the light hydrocarbon stream, such as the Rotliegend Group of formations in Germany and the Netherlands, the Eagle Ford group in Texas, and the Bakken formations in Montana, North Dakota, Saskatchewan, and Manitoba.

As used herein, "base stock" or "base oil stock" refers to semi-synthetic or synthetic isoparaffins that may be used in the production of compounds in a lubricant range of molecular weights. Group I base oil stocks or base oils are defined as base oils with less than 90 wt. % saturated molecules and/or at least 0.03 wt. % sulfur content. Group I base oil stocks also have a viscosity index (VI) of at least 80 but less than 120. Group II base oil stocks or base oils contain at least 90 wt. % saturated molecules and less than 0.03 wt. % sulfur. Group II base oil stocks also have a viscosity index of at least 80 but less than 120. Group III base oil stocks or base oils contain at least 90 wt. % saturated molecules and less than 0.03 wt. % sulfur, with a viscosity index of at least 120. Other hydrocarbons that may be coproduced with base oil stocks include gasoline, diesel fuels, distillates, and other hydrocarbon fluids.

Further, the base oil stocks may be referred to as light neutral (LN), medium neutral (MN), and heavy neutral (HN), for example, as determined by viscosity. The term "neutral" generally indicates the removal of most nitrogen and sulfur atoms to lower reactivity in the final oil. The base oil stocks are generally classified by viscosity, measured at 100° C. as a kinematic viscosity under the techniques described in ASTM D445. The viscosity may be reported in millimeters^2/second (centistokes, cSt). The base oil stocks may also be classified by boiling point range, for example, determined by simulated distillation on a gas chromatograph, under the techniques described in ASTM D 2887.

It may be noted that the viscosity ranges and boiling point ranges described herein are merely examples, and may change, depending on the content of linear paraffins, branched paraffins, cyclic hydrocarbons, and the like. A light neutral base oil stock may have a kinematic viscosity of about 4 cSt to about 6 cSt and may have a boiling point range of about 380° C. to about 450° C. A medium neutral base oil stock may have a kinematic viscosity of about 6 cSt to about 10 cSt and a boiling point range of about 440° C. to about 480° C. A heavy neutral base oil stock may have a kinematic viscosity of about 10 cSt to about 20 cSt, or higher, and a boiling point range of about 450° C. to about 565° C.

As used herein "cracking" is a process that uses decomposition and molecular recombination of organic compounds to produce a greater number of molecules than were initially present. In cracking, a series of reactions take place accompanied by a transfer of hydrogen atoms between molecules. Cracking may be performed in a thermal cracking process, a steam cracking process, a catalytic cracking process, or a hydrocracking process, among others. For example, naphtha, a hydrocarbon mixture that is generally a liquid having molecules with about five to about twelve carbon atoms, may undergo a thermal cracking reaction to form ethylene and $H_2$ among other molecules. In some examples, the free radicals formed during the cracking process may form compounds that are more complex than those in the feed.

As used herein, a "catalyst" is a material that increases the rate of specific chemical reactions under certain conditions of temperature and pressure. Catalysts may be heterogeneous, homogenous, and bound. A heterogeneous catalyst is a catalyst that has a different phase from the reactants. The phase difference may be in the form of a solid catalyst with liquid or gaseous reactants or in the form of immiscible phases, such as an aqueous acidic catalyst suspended in droplets in an organic phase holding the reactants. A heterogeneous catalyst may be bound, such as a zeolite bound with alumina or another metal oxide. A homogeneous catalyst is soluble in the same phase as the reactants, such as an organometallic catalyst dissolved in an organic solvent with a reactant.

The processed impure feed stream is then introduced to a reaction zone in an oligomerization reactor where a homogeneous catalyst, for example, as described with respect to FIG. 5, is used to generate oligomers in an oligomerization process. The oligomerization reaction forms oligomers by reacting small molecule olefins, such as ethylene and propylene, termed monomers, to form a short chain or oligomer. The oligomers may include two to 50 monomers, or more, depending on the reaction conditions used. The oligomers may be linear alpha-olefins with a Schulz-Flory (S-F) distribution. As used herein, an S-F distribution is a probability distribution that describes the relative ratios of oligomers of different lengths that occur in an ideal step-growth oligomerization process. Generally, shorter oligomers are favored over longer oligomers.

However, the S-F distribution of the olefinic products may be controlled by the selection of an organic ligand on the catalyst, or through the selection of reaction conditions such as temperature and pressure. These choices may be used to enhance the production of either light LAOs or heavier, base stock range molecules. The product olefins may then be split into light olefinic (C12−), medium olefinic (C12-C22), and heavy olefinic (C24+) fractions, for example, through conventional distillation. It may be noted that the olefinic fractions may not be pure olefins, but may include other compounds with similar boiling points, such as paraffinic compounds. The light fraction may include C4, C6, C8, C10, and C12 LAOS, the medium fraction may be sent to a dimerization or alkylation reactor using a catalyst selected from a variety of heterogeneous or homogeneous catalysts, and the heavy fraction may be sent to a demetallation zone or stage then to a hydrocracking/hydroisomerization (HDC/HDI) reactor to produce the high quality (Group III) base stock.

The ability to control the S-F distribution makes the targeted production of particular products possible. In some examples, an S-F distribution of about 0.75 to about 0.91 is targeted to make various wax and base stock products with carbon numbers of at least 24. In other examples, an S-F distribution of about 0.83 to about 0.87 is targeted to make products having about 24 to about 50 carbon atoms, such as lower viscosity base stocks. In further examples, an S-F distribution of about 0.6 to about 0.75 is targeted to make products having about four to about 22 carbon atoms, such as various linear alpha olefins. The relation of S-F distribution to various carbon numbers is discussed with respect to FIG. 7.

The oligomerization of low molecular weight olefins, such as ethylene, usually requires a complex and expensive purification scheme to recover high purity ethylene from light hydrocarbon streams created as byproducts in cracking processes. The cost of olefin purification can be from one half to two thirds of the cost of producing high purity ethylene. This provides a number of advantages over previous techniques, including the use of low cost hydrocarbon feedstocks, such as a light hydrocarbon feed from hydraulic fracturing, to produce high value base oil stock. The techniques may also use hydro-processing to perform demetallation during the production of alpha-olefins, when using a metal containing homogeneous catalyst, which may lower the cost over an aqueous quench and extraction process that uses waste water separation and treatment.

For ease of reference, certain terms used in this application and their meanings as used herein are set forth. To the extent a term is not defined herein, it should be given the broadest definition persons in the pertinent art have given that term as reflected in at least one printed publication or issued patent. Further, the present techniques are not limited by the usage of the terms shown herein, as all equivalents, synonyms, new developments, and terms or techniques that serve the same or a similar purpose are considered to be within the scope of the present claims.

Figure 2:
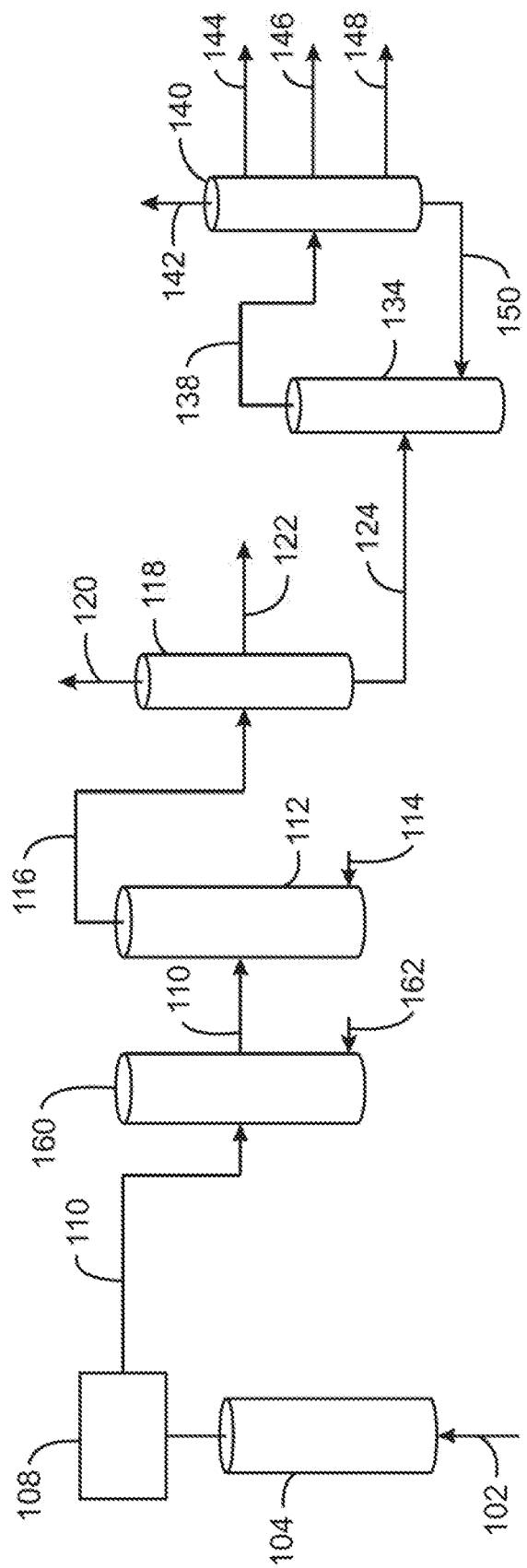
FIG. 2 is a simplified block diagram of another system for producing base oil stocks from a light feedstock, in accordance with examples.

In an example of a process to convert light hydrocarbons to lubricant base oil stock, for example, using the system and method described in greater detail with respect to FIGS. 1(A) and 2, a light gas stream, that may include ethane, is converted, via steam cracking, to an impure olefinic stream or raw product stream. The raw product stream is then sent to a quench fractionator where naphtha, water, steam cracking gas oil, and tar are separated out to form an oligomerization feed stream. The oligomerization feed stream may contain ethylene, propylene, acetylene, propyne, hydrogen, carbon monoxide, methane, ethane, propane, hydrogen disulfide, carbon monoxide, and water. Additional impurities in the ppb level such as Hg, $PH_3$, $AsH_3$, COS, and $NO_x$ may also be contained in the stream.

The oligomerization feed stream may be processed by a caustic tower to remove $H_2S$ and $CO_2$ as well as a drier to remove excess water. As used herein, a "caustic tower" is a separation tower in which a caustic solution, such as an aqueous solution of sodium hydroxide, is contacted with a hydrocarbon stream to remove some heteroatom impurities, such as sulfur compounds and carbon dioxide. The caustic tower may use any number of internal flow arrangements, such as co-current flows and counter-current flows, among others. Other units, such as settlers, may be used with the caustic tower to separate the hydrocarbon from the caustic solution.

The impure olefinic stream is provided to the oligomerization reactor, which converts the olefins to higher molecular weight products. The conversion could be performed in a number of different reactor types including but not limited to a fixed bed, a slurry-bubble column, a CSTR, or a moving bed. Generally, the catalyst is a homogeneous catalyst, as described with respect to FIGS. 5(A) to 5(E).

The higher molecular weight products containing gasoline, diesel, and base oil stock can either be used as is or can then be hydrotreated to remove heteroatoms and saturate olefins. The process conditions and catalyst for the hydroprocessing of paraffins and isoparaffins may be as described above.

A separation train after a steam cracking reactor may include over a dozen steps and pieces of equipment to produce high purity polymer grade ethylene. In addition, the raw product stream may be compressed from about 10 psig to about 550 psig before entering a cold box to remove $H_2$, CO, and $CH_4$ impurities. Decreasing the process pressure greatly reduces the cost of separation and thus the overall process. An exemplary simple separation may include a primary fractionator, a caustic tower, a drier, and an acetylene converter. Further, the raw product stream may be compressed to only about 250 psig to implement the simple separation, lowering costs over compression to 550 psig. The elimination of the remaining back-end separation train decreases the cost of production, but produces an impure olefin stream that can be processed by the impure olefin stream conversion process to produce higher molecular weight products.

FIG. 1(A) is a simplified block diagram of a system 100 for producing high quality hydrocarbons from a light hydrocarbon feed, in accordance with examples. The process begins with the introduction of a hydrocarbon feed stream, such as a light hydrocarbon stream 102, to a steam cracking reactor 104, or cracker. As used herein, a hydrocarbon feed stream may include a composition prior to any treatment, such treatment including cleaning, dehydration or scrubbing, as well as any composition having been partly, substantially or wholly treated for the reduction or removal of one or more compounds or substances, including, but not limited to, sulphur, sulphur compounds, carbon dioxide, water, mercury.

Steam Cracking

In the steam cracking reactor 104, the light hydrocarbon stream 102 is diluted with steam, and then briefly heated to high temperatures in a steam cracker, such as above 800° C., before the reaction is quenched. The reaction time may be milliseconds in length. Oxygen is excluded to prevent degradation and decrease the formation of carbon oxides. The mixture of products in the raw product stream 106 from the steam cracking reactor 104 may be controlled by the feedstock, with the lighter feedstocks of the light hydrocarbon stream 102, such as ethane, propane, or butane, or combinations thereof, among others, favoring the formation of lighter products, such as ethylene, propylene, or butadiene, among others. The product distribution in the raw product stream 106 may also be controlled by the steam/hydrocarbon ratio, the reaction temperature, and the reaction time, among other factors.

A separator 108 may be used to separate the water formed from the steam and degradation products of the raw product stream 106 to form an oligomerization feed stream 110. The separator 108 may include a flash tank to allow water to condense and settle, while product gases flow out, forming the oligomerization feed stream 110. In another example, the separator may be a condenser, as described with respect to FIG. 1(B).

After water removal, the oligomerization feed stream 110 may include, for example, approximately 5% to 90% olefin (ethylene, propylene, butylene, and the like), 5% to 80% hydrogen, 0 to 20% alkyne (acetylene, propyne, and the like), 0% to 50% paraffin (methane, ethane, C3+), 10 to 10,000 wt. ppm of carbon monoxide, and trace water. In some examples, the oligomerization feed stream 110 includes 35% to 55% olefin, 30% to 60% hydrogen, 0.5% to 3% alkyne, 5% to 30% paraffin, and 500 to 2,000 wt. ppm of carbon monoxide.

Oligomerization

The oligomerization feed stream 110 is provided to an oligomerization reactor 112, where it may be contacted with a homogeneous catalyst 114, for example, an organometallic catalyst. In examples described herein, the homogeneous catalyst 114 is generally an impurity tolerant homogeneous catalyst, such as an Iron (II) pyridine-bis-imide (Fe-PBI), capable of the oligomerization of the oligomerization feed stream 110 to C10+ products, C25+, or C50+ products, to produce diesel, lube, and heavier hydrocarbon molecules, such as the base oil stocks.

An example of a homogenous catalyst that may used includes an iron (II) pyridine-bis-imine (Fe-PBI) compound having a structure of formula 1:

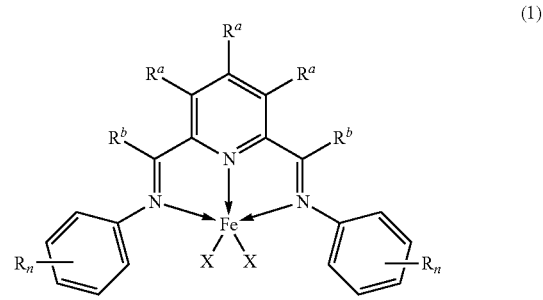

In formula 1, X is a halogen or hydrocarbyl radical, such as Cl. Each R substituent is independently a halogen or hydrocarbyl radical, and each n is an integer from 1-5 representing the number of R groups present. Each n is 1, 2 or 3. In some examples, n is 2 or 3. Each R is a C1-C10 alkyl, or a halogen. In some examples, R is methyl, ethyl or n-propyl. In some examples, at least one R is methyl. In some examples, at least one R is fluorine. In some examples, Rn comprises one, two, or three substituents, wherein each of the substituents is methyl, or fluorine. Each $R^a$, and $R^b$ are independently a hydrogen, halogen or hydrocarbyl radical. In some examples, each $R^a$ is a hydrocarbyl or hydrogen, or a hydrogen. Each $R^b$ is a hydrocarbyl, such as a C1-C10 alkyl, or methyl.

The homogenous catalyst may include an iron (II) pyridine-bis-imine (Fe-PBI) compound having a structure of formula 2:

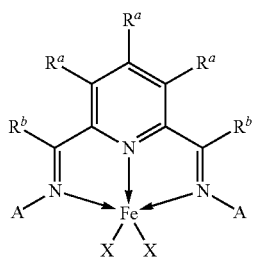

(2)

In formula 2, each $R^a$, $R^b$ and X are as defined above, and each A is independently a substituted aryl group including one, two or three R substituents as defined above.

In some examples, each A is defined by a structure shown in formula 3:

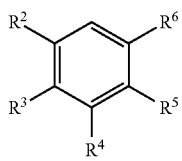

(3)

In formula 3, the one position of the phenyl ring is bonded to the nitrogen of the iron (II) pyridine-bis-imine complex, and each $R^2$, $R^3$, $R^4$, $R^5$, and $R^6$ are independently C1 to C10 alkyl, halogen or hydrogen radical. In some examples, each $R^2$, $R^3$, $R^4$, $R^5$, and $R^6$ are independently methyl, ethyl, n-propyl, fluoro, and hydrogen. In some examples, each $R^2$, $R^3$, $R^4$, $R^5$, and $R^6$ are independently methyl, fluoro and hydrogen. In some examples, each $R^2$ is methyl and each $R^6$ is fluoro. In some examples, each $R^2$ is fluoro and each $R^4$ is methyl. In some examples, each $R^2$ and $R^6$ are methyl, and each $R^4$ is fluoro. In some examples, each $R^2$ is methyl and each $R^4$ is fluoro. In some examples, each $R^2$ is methyl. Examples of homogenous catalysts that may be used for the oligomerization are discussed further with respect to FIGS. 5(A)-5(F). In some examples, the organometallic catalysts may be supported to form heterogeneous catalysts.

Generally, the homogeneous catalysts are activated. After the complexes have been synthesized, catalyst systems may be formed by combining them with activators in any manner known from the literature, including by supporting them for use in slurry or gas phase polymerization reactions. The catalyst systems may also be added to or generated in solution polymerization or bulk polymerization (in the monomer). The catalyst system typically includes a complex as described above and an activator such as alumoxane or a non-coordinating anion. Activation may be performed using alumoxane solution including methyl alumoxane, referred to as MAO, as well as modified MAO, referred to herein as MMAO, containing some higher alkyl groups to improve the solubility. Particularly useful MAO can be purchased from Albemarle, typically in a 10 wt. % solution in toluene. In some example, the catalyst system uses an activator selected from alumoxanes, such as methyl alumoxane, modified methyl alumoxane, ethyl alumoxane, iso-butyl alumoxane, and the like.

When an alumoxane or modified alumoxane is used, the complex-to-activator molar ratio is from about 1:3000 to 10:1; or from 1:2000 to 10:1; or from 1:1000 to 10:1; or from 1:500 to 1:1; or from 1:300 to 1:1; or from 1:200 to 1:1; or from 1:100 to 1:1; or from 1:50 to 1:1; or from 1:10 to 1:1. When the activator is an alumoxane (modified or unmodified), some examples select the maximum amount of activator at a 5000-fold molar excess over the catalyst precursor (per metal catalytic site). The preferred minimum activator-to-complex ratio is 1:1 molar ratio.

Activation may also be performed using non-coordinating anions, (NCAs), of the type described in European Patent Application Nos. 277 003 A1 and 277 004 A1. An NCA may be added in the form of an ion pair using, for example, [DMAH]+ [NCA]− in which the N,N-dimethylanilinium (DMAH) cation reacts with a basic leaving group on the transition metal complex to form a transition metal complex cation and [NCA]−. The cation in the precursor may, alternatively, be trityl. Alternatively, the transition metal complex may be reacted with a neutral NCA precursor, such as $B(C_6F_5)_3$, which abstracts an anionic group from the complex to form an activated species. Useful activators include N,N-dimethylanilinium tetrakis (pentafluorophenyl)borate (i.e., $[PhNMe_2H]B(C_6F_5)_4$) and N,N-dimethylanilinium tetrakis (heptafluoronaphthyl)borate, where Ph is phenyl, and Me is methyl.

Additionally, activators useful herein include those described in U.S. Pat. No. 7,247,687 at column 169, line 50 to column 174, line 43, particularly column 172, line 24 to column 173, line 53. These are incorporated by reference herein.

Non-coordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion.

The term NCA also includes neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the noncoordinating anion. Suitable metals include, but are not limited to, aluminum, gold, and platinum. Suitable metalloids include, but are not limited to, boron, aluminum, phosphorus, and silicon. A stoichiometric activator can be either neutral or ionic. The terms ionic activator, and stoichiometric ionic activator can be used interchangeably. Likewise, the terms neutral stoichiometric activator, and Lewis acid activator can be used interchangeably. The term non-coordinating anion includes neutral stoichiometric activators, ionic stoichiometric activators, ionic activators, and Lewis acid activators.

In an example described herein, the non-coordinating anion activator is represented by the following formula (1):

$$(Z)_d^+(A^{d-}) \qquad (1)$$

wherein Z is (L-H) or a reducible Lewis acid; L is a neutral Lewis base; H is hydrogen and (L-H)$^+$ is a Bronsted acid; A$^{d-}$ is a non-coordinating anion having the charge d−; and d is an integer from 1 to 3.

When Z is (L-H) such that the cation component is (L-H)d+, the cation component may include Bronsted acids such as protonated Lewis bases capable of protonating a moiety, such as an alkyl or aryl, from the catalyst precursor, resulting in a cationic transition metal species, or the activating cation (L-H)d+ is a Bronsted acid, capable of donating a proton to the catalyst precursor resulting in a transition metal cation, including ammoniums, oxoniums, phosphoniums, silyliums, and mixtures thereof, or ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid, it may be represented by the formula: (Ar$_3$C+), where Ar is aryl or aryl substituted with a heteroatom, or a C$_1$ to C$_{40}$ hydrocarbyl, the reducible Lewis acid may be represented by the formula: (Ph$_3$C+), where Ph is phenyl or phenyl substituted with a heteroatom, and/or a C1 to C40 hydrocarbyl. In an example, the reducible Lewis acid is triphenyl carbenium.

Examples of the anion component Ad− include those having the formula [Mk+Qn]d− wherein k is 1, 2, or 3; n is 1, 2, 3, 4, 5 or 6, or 3, 4, 5 or 6; n−k=d; M is an element selected from Group 13 of the Periodic Table of the Elements, or boron or aluminum, and Q is independently a hydride, bridged or unbridged dialkylamido, halide, alkoxide, aryloxide, hydrocarbyl radicals, said Q having up to about 20 carbon atoms with the proviso that in not more than one occurrence is Q a halide, and two Q groups may form a ring structure. Each Q may be a fluorinated hydrocarbyl radical having about 1 to 20 carbon atoms, or each Q is a fluorinated aryl radical, or each Q is a pentafluoryl aryl radical. Examples of suitable Ad-components also include diboron compounds as disclosed in U.S. Pat. No. 5,447,895, which is fully incorporated herein by reference.

In an example in any of the NCAs represented by Formula 1 described above, the anion component Ad− is represented by the formula [M*k*+Q*n*]d*− wherein k* is 1, 2, or 3; n* is 1, 2, 3, 4, 5, or 6 (or 1, 2, 3, or 4); n*−k*=d*; M* is boron; and Q* is independently selected from hydride, bridged or unbridged dialkylamido, halogen, alkoxide, aryloxide, hydrocarbyl radicals, said Q* having up to about 20 carbon atoms with the proviso that in not more than 1 occurrence is Q* a halogen.

The techniques describe herein also relate to a method to oligomerize olefins including contacting olefins (such as ethylene, butene, hexane, and others) with a catalyst complex as described above and an NCA activator represented by the Formula (2):

$$R_nM^{**}(ArNHal)_{4-n} \qquad (2)$$

where R is a monoanionic ligand; M** is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically the NCA including an anion of Formula 2 also includes a suitable cation that is essentially non-interfering with the ionic catalyst complexes formed with the transition metal compounds, or the cation is Z$_d^+$ as described above.

In an example, in any of the NCAs including an anion represented by Formula 2 described above, R is selected from the group consisting of C$_1$ to C$_{30}$ hydrocarbyl radicals. In an example, C$_1$ to C$_{30}$ hydrocarbyl radicals may be substituted with one or more C$_1$ to C$_{20}$ hydrocarbyl radicals, halide, hydrocarbyl substituted organometalloid, dialkylamido, alkoxy, aryloxy, alkysulfido, arylsulfido, alkylphosphido, arylphosphide, or other anionic substituent; fluoride; bulky alkoxides, where bulky means C$_4$ to C$_{20}$ hydrocarbyl radicals; —SRa, —NR$^a_2$, and —PR$^a_2$, where each R$^a$ is independently a monovalent C$_4$ to C$_{20}$ hydrocarbyl radical including a molecular volume greater than or equal to the molecular volume of an isopropyl substitution or a C$_4$ to C$_{20}$ hydrocarbyl substituted organometalloid having a molecular volume greater than or equal to the molecular volume of an isopropyl substitution.

In an example, in any of the NCAs including an anion represented by Formula 2 described above, the NCA also includes cation including a reducible Lewis acid represented by the formula: (Ar$_3$C+), where Ar is aryl or aryl substituted with a heteroatom, and/or a C$_1$ to C$_{40}$ hydrocarbyl, or the reducible Lewis acid represented by the formula: (Ph$_3$C+), where Ph is phenyl or phenyl substituted with one or more heteroatoms, and/or C$_1$ to C$_{40}$ hydrocarbyls.

In an example in any of the NCAs including an anion represented by Formula 2 described above, the NCA may also include a cation represented by the formula, (L-H)d+, wherein L is an neutral Lewis base; H is hydrogen; (L-H) is a Bronsted acid; and d is 1, 2, or 3, or (L-H)d+ is a Bronsted acid selected from ammoniums, oxoniums, phosphoniums, silyliums, and mixtures thereof.

Further examples of useful activators include those disclosed in U.S. Pat. Nos. 7,297,653 and 7,799,879, which are fully incorporated by reference herein.

In an example, an activator useful herein includes a salt of a cationic oxidizing agent and a non-coordinating, compatible anion represented by the Formula (3):

$$(OX^{e+})_d(A^{d-})_e \qquad (3)$$

wherein OX$^{e+}$ is a cationic oxidizing agent having a charge of e+; e is 1, 2 or 3; d is 1, 2 or 3; and A$^{d-}$ is a non-coordinating anion having the charge of d− (as further described above). Examples of cationic oxidizing agents include: ferrocenium, hydrocarbyl-substituted ferrocenium, Ag$^+$, or Pb$^{+2}$. Suitable examples of A$^{d-}$ include tetrakis (pentafluorophenyl)borate.

Activators useful in catalyst systems herein include: trimethylammonium tetrakis(perfluoronaphthyl)borate, N,N-dimethylanilinium tetrakis(perfluoronaphthyl) borate, N,N-diethylanilinium tetrakis(perfluoronaphthyl)borate, triphenylcarbenium tetrakis(perfluoronaphthyl)borate, trimethylammonium tetrakis(perfluorobiphenyl)borate, N,N-dimethylanilinium tetrakis(perfluorobiphenyl)borate, triphenylcarbenium tetrakis(perfluorobiphenyl)borate, and the types disclosed in U.S. Pat. No. 7,297,653, which is fully incorporated by reference herein.

Suitable activators also include: N,N-dimethylanilinium tetrakis (perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Ph3C+][B(C6F5)4−], [Me3NH+][B(C6F5)4−]; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In an example, the activator includes a triaryl carbonium (such as triphenylcarbenium tetraphenylborate, triphenylcarbenium tetrakis(pentafluorophenyl) borate, triphenylcarbenium tetrakis-(2,3,4,6-tetrafluorophenyl)borate, triphenyl carbenium tetrakis(perfluoronaphthyl)borate, triphenylcarbenium tetrakis(perfluorobiphenyl)borate, triphenylcarbenium tetrakis(3,5-bis(trifluoromethyl) phenyl)borate).

In an example, two NCA activators may be used in the oligomerization and the molar ratio of the first NCA activator to the second NCA activator can be any ratio. In an example, the molar ratio of the first NCA activator to the second NCA activator is 0.01:1 to 10,000:1, or 0.1:1 to 1000:1, or 1:1 to 100:1.

In an example, the NCA activator-to-catalyst ratio is a 1:1 molar ratio, or 0.1:1 to 100:1, or 0.5:1 to 200:1, or 1:1 to 500:1 or 1:1 to 1000:1. In an example, the NCA activator-to-catalyst ratio is 0.5:1 to 10:1, or 1:1 to 5:1.

In an example, the catalyst compounds can be combined with combinations of alumoxanes and NCAs (see for example, U.S. Pat. Nos. 5,153,157; 5,453,410; European Patent Application No. EP 0 573 120 B1; WIPO Patent Publication No. WO 94/07928; and WIPO Patent Publication No. WO 95/14044 which discuss the use of an alumoxane in combination with an ionizing activator, all of which are incorporated by reference herein).

In an example, when an NCA (such as an ionic or neutral stoichiometric activator) is used, the complex-to-activator molar ratio is typically from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; 1:1 to 1:1.2.

Alternately, a co-activator or chain transfer agent, such as a group 1, 2, or 13 organometallic species (e.g., an alkyl aluminum compound such as tri-n-octyl aluminum), may also be used in the catalyst system herein. The complex-to-co-activator molar ratio is from 1:100 to 100:1; 1:75 to 75:1; 1:50 to 50:1; 1:25 to 25:1; 1:15 to 15:1; 1:10 to 10:1; 1:5 to 5:1; 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

When the catalyst compounds are ligated metal dihalide compounds, a co-activator is always used when an NCA activator is used.

Other catalysts, including heterogeneous catalyst such as zeolites, may be used for the oligomerization. However, the oligomerization process may not be as clean, e.g., producing more isomers and fewer linear alpha olefins. Zeolites that may be suitable for this conversion include, but are not limited to 10-ring zeolites such as ZSM-5 (MFI), ZSM-11 (MEL), ZSM-48 (MRE), and the like, with $Si/Al_2$ ratios from 5 to 500. The zeolites are used in their proton form and may or may not be promoted with metals by ion exchange or impregnation. In addition, the binder used during formulation may have an effect on the yield and product slate.

The oligomerization process can be performed as a single step process or a two-step process. In a single step process, all of the oligomerization is performed in a single stage or in a single reactor in the oligomerization reactor 112. The oligomerization feed stream 110 is introduced into the single stage generally as a gas phase feed. The oligomerization feed stream 110 is contacted with the homogeneous catalyst 114 under effective oligomerization conditions. A solvent, such as hexane, may be used for the oligomerization process, and recycled. The ethylene feed may be contacted with the homogenous catalyst 114 at a temperature of 20° C. to 300° C. In some examples, the reaction temperature is at least 25° C., or at least 50° C., or at least 100° C., and is 250° C. or less, or 225° C. or less. The total pressure can be from 1 atm (100 kPa) to 200 atm (20.2 MPa). In some examples, the total pressure is 100 atm (10.1 MPa) or less. In some examples, the oligomerization feed is contacted with the catalyst at a hydrogen partial pressure that is at least 1% of the total pressure, such as at least 5% of the total pressure or at least 10% of the total pressure or up to about 50% on a volumetric basis. The reaction forms a raw oligomer stream 116 that can then be fractionated in a distillation column 118. An optional step of to quench the catalyst may be used, which consists of using a base, either aqueous or organic, before the fractionation.

In the distillation column 118, three streams may be separated from the raw oligomer stream 116. These may include a light olefinic stream 120, an intermediate olefinic stream 122 and a heavy olefinic stream 124. It may be noted that the olefinic streams 120, 122, and 124 may not be composed of 100% olefinic compounds, but may include a number of other compounds, such as paraffins, that are removed in the same boiling point ranges as the olefinic compounds. As higher molecular weight compounds are formed, the amounts of paraffinic compounds may increase as well.

The light olefinic stream 120 may include, for example, linear alpha-olefins having from about four carbon atoms to about 10 carbon atoms and unreacted ethylene. Further, as higher molecular weight compounds are formed, the amounts of paraffinic compounds may increase as well. The light olefinic stream 120 may be processed to separate an unreacted ethylene stream 126 which may be combined with the oligomerization feed stream 110 and provided to the oligomerization reactor 112. After separation of the unreacted ethylene stream 126, the remaining stream 128 may be processed to recover linear alpha-olefins, for example, having less than about 12 carbon atoms. This separation may be performed by a distillation column, a cold box, or other separation methods.

The intermediate olefinic stream 122 may be provided to a dimerization reactor 130. As an example, the intermediate olefinic stream 122 may include compounds having about 12 carbon atoms to compounds having about 22 carbon atoms, although this may be adjusted based on the takeoff point in the distillation column 118. In the dimerization reactor 130, the intermediate olefinic stream 122 may be contacted with a homogeneous or heterogeneous catalyst to be dimerized to form carbon compounds having about 24 carbon atoms to about 44 carbon atoms. The reaction may be run at a temperature of about 50° C. to about 400° C., and a pressure of about 50 psig to about 2000 psig. The dimerized stream 132 may be returned to the distillation column 118, in which lower carbon number compounds, such as unreacted compounds having about 12 carbon atoms to about 22 carbon atoms, may be further sent to the dimerization reactor 130 for processing.

The heavy olefinic stream 124, may have at least about 24 carbon atoms. To lower the amounts of contaminants, as well as to upgrade the final products, the heavy olefinic stream 124 may be provided to a hydro-processing reactor 134 to remove contaminants and improve product properties, such as cold flow properties. For example, hydrotreatment or mild hydrocracking can be used for removal of contaminants, and optionally to provide some viscosity index uplift, while hydrocracking and hydroisomerization, termed catalytic HDC/HDI, may be used to improve cold flow properties.

Hydro-Processing

As used herein, "hydro-processing" includes any hydrocarbon processing that is performed in the presence of hydrogen. The hydrogen may be added to the hydro-processing reactor 134 as a hydrogen treat stream 136. The hydrogen treat stream 136 is fed or injected into a vessel or reaction zone or hydro-processing zone in which the hydro-processing catalyst is located. The hydrogen treat stream 136 may be pure hydrogen or a hydrogen-containing gas, which is a gas stream containing hydrogen in an amount that is sufficient for the intended reactions. The hydrogen treat stream 136 may include one or more other gasses, such as nitrogen and light hydrocarbons, that do not interfere with or affect either the reactions or the products. Impurities, such as $H_2S$ and $NH_3$ are undesirable and would typically be removed from the hydrogen treat stream 136 before it is conducted to the reactor. The hydrogen treat stream 136 introduced into a reaction stage may include at least 50 vol. % hydrogen or at least 75 vol. % hydrogen. The products of the hydro-processing reactor 134, termed a hydro-processed stream 138, may have lower contaminants, including metals and heteroatom compounds, as well as improved viscosities, viscosity indices, saturates content, low temperature properties, volatilities and depolarization, and the like.

Various types of hydro-processing can be used in the production of fuels and base oil stocks, such as hydroconversion, hydrocracking, hydrogenation, hydrotreating, hydrodesulfurization, hydrodenitrogenation, hydrodemetallation, and hydroisomerization, among others. Typical processes include a demetallation process to remove metallic remnants of the catalyst. Further, a catalytic dewaxing, or hydrocracking/hydroisomerization (HDC/HDI) process, may be included to modify viscosity properties or cold flow properties, such as pour point and cloud point. The hydrocracked or dewaxed feed can then be hydrofinished, for example, to saturate olefins and aromatics from the heavy olefinic stream 124. In addition to the above, a hydrotreatment stage can also be used for contaminant removal. The hydrotreatment of the oligomer feed to remove contaminants may be performed prior to or after the hydrocracking or the HDC/HDI.

In the discussion below, a stage in a hydro-processing reactor 134 can correspond to a single reactor or a plurality of reactors. In some examples, multiple reactors can be used to perform one or more of the processes, or multiple parallel reactors can be used for all processes in a stage. Each stage or reactor may include one or more catalyst beds containing hydro-processing catalyst. Note that a catalyst bed in the discussion below may refer to a partial physical catalyst bed. For example, a catalyst bed within a reactor could be filled partially with a hydrocracking catalyst and partially with an HDC/HDI catalyst. For convenience in description, even though the two catalysts may be stacked together in a single catalyst bed, the hydrocracking catalyst and the HDC/HDI catalyst can each be referred to conceptually as separate catalyst beds. As an example, the hydro-processing reactor 134 shown in FIG. 1 includes a demetallation reactor 134A and a hydrocracking/hydroisomerization (HDC/HDI) reactor 134B, shown as separate reactors or units.

Hydrodemetallation

The demetallation reactor 134A includes a demetallation catalyst and operates at about 200-500° C. and 50-1200 psi. The demetallation reactor removes metals in the homogeneous catalyst, such as Fe and Al, from the organic components, which are deposited on the solid catalysts. The demetallation reactor is typically used for the removal of metals in petroleum oil. The metals in petroleum oil exists as metal complexes, much like the in metals in the homogeneous catalysts.

Hydroisomerization/Hydrocracking (HDC/HDI)

In the HDC/HDI reactor 134B, suitable HDC/HDI (dewaxing) catalysts may include molecular sieves such as crystalline aluminosilicates, or zeolites. In various examples, the molecular sieve includes ZSM-5, ZSM-22, ZSM-23, ZSM-35, ZSM-48, SAPO-11, zeolite Beta, or zeolite Y, or includes combinations thereof, such as ZSM-23 and ZSM-48, or ZSM-48 and zeolite Beta. Molecular sieves that are selective for dewaxing by isomerization, as opposed to cracking, may be used, such as ZSM-48, ZSM-23, SAPO-11 or any combinations thereof. The molecular sieves may include a 10-member ring 1-D molecular sieve. Examples include EU-1, ZSM-35 (or ferrierite), ZSM-11, ZSM-57, NU-87, SAPO-11, ZSM-48, ZSM-23, and ZSM-22. Some of these materials may be more efficient, such as EU-2, EU-11, ZBM-30, ZSM-48, or ZSM-23. Note that a zeolite having the ZSM-23 structure with a silica to alumina ratio of from 20:1 to 40:1 may be referred to as SSZ-32. Other molecular sieves that are isostructural with the above materials include Theta-I, NU-10, EU-13, KZ-1, and NU-23. The HDC/HDI catalyst may include a binder for the molecular sieve, such as alumina, titania, silica, silica-alumina, zirconia, or a combination thereof, for example alumina and titania or silica and zirconia, titania, or both.

In various examples, the catalysts according to the disclosure further include a hydrogenation catalyst to saturate olefins and aromatics, which may be termed hydrofinishing herein. The hydrogenation catalyst typically includes a metal hydrogenation component that is a Group VI and/or a Group VIII metal. In some examples, the metal hydrogenation component is a Group VIII noble metal. For example, the metal hydrogenation component may be Pt, Pd, or a mixture thereof. Further, the metal hydrogenation component may be a combination of a non-noble Group VIII metal with a Group VI metal. Suitable combinations can include Ni, Co, or Fe with Mo or W, or, in some examples, Ni with Mo or W.

The metal hydrogenation component may be added to the catalyst in any convenient manner. For example, the metal hydrogenation component may be combined with the catalyst using an incipient wetness. In this technique, after combining a zeolite and a binder, the combined zeolite and binder can be extruded into catalyst particles. These catalyst particles may then be exposed to a solution containing a suitable metal precursor. In some examples, metal can be added to the catalyst by ion exchange, where a metal precursor is added to a mixture of zeolite (or zeolite and binder) prior to extrusion.

The amount of metal in the catalyst may be at least about 0.1 wt. % based on catalyst, or at least about 0.15 wt. %, or at least about 0.2 wt. %, or at least about 0.25 wt. %, or at least about 0.3 wt. %, or at least about 0.5 wt. % based on catalyst. The amount of metal in the catalyst may be about 20 wt. % or less based on catalyst, or about 10 wt. % or less, or about 5 wt. % or less, or about 2.5 wt. % or less, or about 1 wt. % or less. For examples where the metal is Pt, Pd, another Group VIII noble metal, or a combination thereof, the amount of metal may be from about 0.1 to about 5 wt. %, about 0.1 to about 2 wt. %, or about 0.25 to about 1.8 wt. %, or about 0.4 to about 1.5 wt. %. For examples where the metal is a combination of a non-noble Group VIII metal with a Group VI metal, the combined amount of metal may be from about 0.5 wt. % to about 20 wt. %, or about 1 wt. % to about 15 wt. %, or about 2.5 wt. % to about 10 wt. %.

The HDC/HDI catalysts may also include a binder. In some examples, the HDC/HDI catalysts may use a low surface area binder. A low surface area binder represents a binder with a surface area of about 100 $m^2/g$ or less, or 80 $m^2/g$ or less, or about 70 $m^2/g$ or less. The amount of zeolite in a catalyst formulated using a binder can be from about 30 wt. % zeolite to about 90 wt. % zeolite relative to the combined weight of binder and zeolite. In some examples, the amount of zeolite may be at least about 50 wt. % of the combined weight of zeolite and binder, such as at least about 60 wt. % or from about 65 wt. % to about 80 wt. %.

A zeolite can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture.

Process conditions in a catalytic HDC/HDI zone in a may include a temperature of from about 200 to about 450° C., or from about 270 to about 400° C., a hydrogen partial pressure of from about 1.8 MPag to about 34.6 MPag (about 250 psig to about 5000 psig), or from about 4.8 MPag to about 20.8 MPag, and a hydrogen circulation rate of from about 35.6 $m^3/m^3$ (200 SCF/B) to about 1781 $m^3/m^3$ (10,000 SCF/B), or from about 178 $m^3/m^3$ (1000 SCF/B) to about 890.6 $m^3/m^3$ (5000 SCF/B). In other examples, the conditions can include temperatures in the range of about 343° C. (600° F.) to about 435° C. (815° F.), hydrogen partial pressures of from about 3.5 MPag-20.9 MPag (about 500 psig to 3000 psig), and hydrogen treat gas rates of from about 213 $m^3/m^3$ to about 1068 $m^3/m^3$ (1200 SCF/B to 6000 SCF/B). These latter conditions may be suitable, for example, if the HDC/HDI stage is operating under sour conditions, e.g., in the presence of high concentrations of sulfur compounds.

The liquid hourly space velocity (LHSV) can vary depending on the ratio of hydrocracking catalyst used to hydroisomerization catalyst in the HDC/HDI catalyst. Relative to the combined amount of hydrocracking and hydroisomerization catalyst, the LHSV may be from about 0.2 $h^{-1}$ to about 10 $h^{-1}$, such as from about 0.5 $h^{-1}$ to about 5 $h^{-1}$ and/or from about 1 $h^{-1}$ to about 4 $h^{-1}$. Depending on the ratio of hydrocracking catalyst to hydroisomerization catalyst used, the LHSV relative to only the HDC/HDI catalyst can be from about 0.25 $h^{-1}$ to about 50 $h^{-1}$, such as from about 0.5 $h^{-1}$ to about 20 $h^{-1}$, or from about 1.0 $h^{-1}$ to about 4.0 $h^{-1}$ Hydrotreatment Conditions Hydrotreatment may be used to reduce the sulfur, nitrogen, and aromatic content of the heavy olefinic stream 124, for example, removing nitrogen compounds from the oligomerization catalyst. The catalysts used for hydrotreatment may include hydro-processing catalysts that include at least one Group VIII non-noble metal (Columns 8-10 of IUPAC periodic table), such as Fe, Co, or Ni, or Co or Ni, and at least one Group VI metal (Column 6 of IUPAC periodic table), such as Mo or W. Such hydro-processing catalysts may include transition metal sulfides that are impregnated or dispersed on a refractory support or carrier such as alumina or silica. The support or carrier itself typically has no significant or measurable catalytic activity. Substantially carrier- or support-free catalysts, commonly referred to as bulk catalysts, generally have higher volumetric activities than their bound counterparts.

In addition to alumina or silica, other suitable support or carrier materials can include, but are not limited to, zeolites, titania, silica-titania, and titania-alumina. Suitable aluminas include porous aluminas, such as gamma or eta forms, having average pore sizes from about 50 to about 200 Angstrom (Å), or about 75 to about 150 Å; a surface area from about 100 to about 300 $m^2/g$, or about 150 to about 250 $m^2/g$; and a pore volume of from about 0.25 to about 1.0 $cm^3/g$, or about 0.35 to about 0.8 $cm^3/g$. Generally, any convenient size, shape, or pore size distribution for a catalyst suitable for hydrotreatment of a distillate (including lubricant base oil) boiling range feed in a conventional manner may be used. Further, more than one type of hydro-processing catalyst can be used in one or multiple reaction vessels. A Group VIII non-noble metal, in oxide form, may be present in an amount ranging from about 2 wt. % to about 40 wt. %, or about 4 wt. % to about 15 wt. %. A Group VI metal, in oxide form, can typically be present in an amount ranging from about 2 wt. % to about 70 wt. %, or, for bound catalysts, from about 6 wt. % to about 40 wt. % or from about 10 wt. % to about 30 wt. %. These weight percentages are based on the total to weight of the catalyst. Suitable metal catalysts include cobalt/molybdenum (for example, including about 1-10% Co as oxide and about 10-40% Mo as oxide), nickel/molybdenum (including about 1-10% Ni as oxide and about 10-40% Co as oxide), or nickel/tungsten (including about 1-10% Ni as oxide and about 10-40% W as oxide) on alumina, silica, silica-alumina, or titania, among others.

The hydrotreatment is carried out in the presence of hydrogen, for example, from the hydrogen treat stream 136. Hydrotreating conditions can include temperatures of about 200° C. to about 450° C., or about 315° C. to about 425° C.; pressures of about 250 psig (1.8 MPag) to about 5000 psig (34.6 MPag) or about 300 psig (2.1 MPag) to about 3000 psig (20.8 MPag); liquid hourly space velocities (LHSV) of about 0.1 $hr^{-1}$ to about 10 $hr^{-1}$; and hydrogen treat rates of about 200 SCF/Btu (35.6 $m^3/m^3$) to 10,000 SCF/Btu (1781 $m^3/m^3$) or about 500 (89 $m^3/m^3$) to about 10,000 SCF/B (1781 $m^3/m^3$) or about 3000 psig (3.5 MPag-20.9 MPag), and hydrogen treat gas rates of from about 213 $m^3/m^3$ to about 1068 $m^3/m^3$ (1200 SCF/Btu 6000 SCF/Btu).

Hydrofinishing and Aromatic Saturation Process

In some examples, a hydrofinishing stage, an aromatic saturation stage, or both may be used. These stages are termed finishing processes herein. Finishing processes may improve color and stability in a final product by lowering the amounts of unsaturated or oxygenated compounds in the final product streams. The finishing may be performed in the hydro-processing reactor 134 after the last hydrocracking or hydroisomerization stage. Further, the finishing may occur after fractionation of a hydro-processed stream 138 in a product distillation column 140. If finishing occurs after fractionation, the finishing may be performed on one or more portions of the fractionated product. In some examples, the entire effluent from the last hydrocracking or HDC/HDI process can be finished prior to fractionation into individual product streams.

In some examples, the finishing processes, including hydrofinishing and aromatic saturation, refer to a single process performed using the same catalyst. Alternatively, one type of catalyst or catalyst system can be provided to perform aromatic saturation, while a second catalyst or catalyst system can be used for hydrofinishing. Typically the finishing processes will be performed in a separate reactor from the HDC/HDI or hydrocracking processes to facilitate the use of a lower temperature for the finishing processes. However, an additional hydrofinishing reactor following a hydrocracking or HDC/HDI process, but prior to fractionation, may still be considered part of a second stage of a reaction system conceptually.

Finishing catalysts can include catalysts containing Group VI metals, Group VIII metals, and mixtures thereof. In an example, the metals may include a metal sulfide compound having a strong hydrogenation function. The finishing catalysts may include a Group VIII noble metal, such as Pt, Pd, or a combination thereof. The mixture of metals may also be present as bulk metal catalysts wherein the amount of metal is 30 wt. % or greater based on the catalyst. The metals and metal compounds may be bound, for example, on a metal oxide. Suitable metal oxide supports include low acidic oxides such as silica, alumina, silica-aluminas or titania, or, in some examples, alumina.

The catalysts for aromatic saturation may include at least one metal having relatively strong hydrogenation function on a porous support. Typical binding materials include amorphous or crystalline oxide materials such as alumina, silica, and silica-alumina. The binding materials may also be modified, such as by halogenation or fluorination. The metal content of the catalyst may be as high as 20 wt. % for non-noble metals. In an example, a hydrofinishing catalyst may include a crystalline material belonging to the M41S class or family of catalysts. The M41S family of catalysts are mesoporous materials having high silica content. Examples include MCM-41, MCM-48 and MCM-50. Examples include MCM-41, MCM-48, MCM-49, and MCM-50. Other catalysts that may be used include Beta, Y, and other large pore zeolites (12-member ring MR and up). If separate catalysts are used for aromatic saturation and hydrofinishing, an aromatic saturation catalyst can be selected based on activity or selectivity for aromatic saturation, while a hydrofinishing catalyst can be selected based on activity for improving product specifications, such as product color and polynuclear aromatic reduction.

Hydrofinishing conditions can include temperatures from about 125° C. to about 425° C., or about 180° C. to about 280° C., a hydrogen partial pressure from about 500 psig (3.4 MPa) to about 3000 psig (20.7 MPa), or about 1500 psig (10.3 MPa) to about 2500 psig (17.2 MPa), and an LHSV from about 0.1 hr$^{-1}$ to about 5 hr$^{-1}$ LHSV, or, in some examples, 0.5 hr$^{-1}$ to 1.5 hr$^{-1}$. Additionally, a hydrogen treat gas rate of from about 35.6 m$^3$/m$^3$ to about 1781 m$^3$/m$^3$ (200 SCF/B to 10,000 SCF/B) can be used.

Fractionation and Products

After hydro-processing, the hydro-processed oligomers in the hydro-processed stream 138 can be fractionated in the product distillation column 140. Any number of fractions may be isolated, including, for example, a distillate stream 142 that may include hydrocarbon fluids, such as gasoline, naphtha, diesel, or a distillate fuel fraction, among others. Fractions that form base oil stocks for lubricants and other hydrocarbon products, may be isolated, including, for example, a light neutral stream 144, and a medium neutral stream 146, in addition to a heavy neutral stream 148.

A bottoms stream 150 may also be isolated. In some examples, the bottoms stream 150 is returned to the hydro-processing reactor 134 for further processing.

The system of FIG. 1(A) is not limited to the use of dimerization for the upgrading of products. In some examples, alkylation may be used to upgrade the molecular weights and branching. As used herein, "alkylation" refers to a process in which a feed stream containing olefins, such the intermediate olefinic stream 122, is reacted with another stream containing hydrocarbons, such as a mixed xylenes or naphthalene stream, among others, in an alkylation reactor. The process converts at least a portion of the olefinic compounds to higher molecular compounds. An alkylation reactor may react the feed streams in the presence of a catalyst, for example, an acid, such as sulfuric acid or hydrofluoric acid, or a solid acid, such as a zeolite, for example zeolite Y, zeolite beta, and zeolite of the MWW family, among others. The alkylation may be run at a temperature of about 150° C. to about 250° C., and a pressure of about 300 psig to about 1000 psig. The process provides an alkylated stream that may be processed in the alkylation reactor to remove acid and other contaminants before being provided to a separation or distillation column.

In the distillation column, light or unreacted compounds may be separated into an unreacted stream and blended with the intermediate olefinic stream to be fed back into the alkylation reactor. A heavy product stream may be separated out and provided to the HDC/HDI reactor 134B.

Figure 1B:
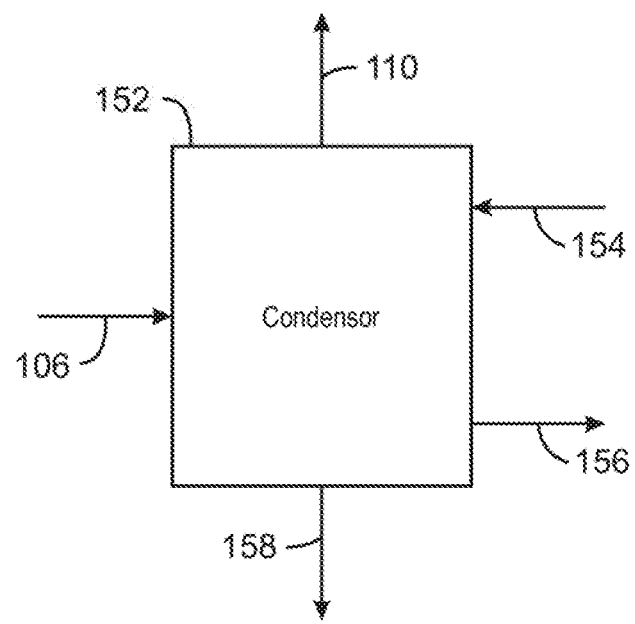
FIG. 1(B) is a simplified block diagram of a system for removing water from an impure ethylene stream formed from a light feedstock, in accordance with examples.

FIG. 1(B) is a simplified block diagram of a recovery system 108 for purifying an impure ethylene stream formed from the dehydration of ethanol, in accordance with examples. Like numbered items are as described with respect to FIG. 1. The recovery system 108 may be as simple as a condenser 152. In this arrangement, the raw product stream 106, including ethylene, water from the initial azeotropic mixture, and water from the dehydration process, is fed to the condenser 152. A coolant-in stream 154 may include water from a cooling tower, or lower temperature coolants for enhanced removal of water, such as propane, ammonia, or other coolants. A coolant-out stream 156 may return the coolant, warmed by condensing water, to a coolant system. The condensed water may be removed in a water stream 158, while the ethylene stream 110 exits through a different port on the vessel and is provided to downstream processing units, such as the oligomerization reactor 112. As described herein, other water removal systems may be used, such as flash tanks, caustic systems, absorption systems, and the like. In some examples, the purification system may remove other compounds, such as sulfur compounds and nitrogen compounds, lowering poison concentrations before the oligomerization process.

FIG. 2 is a simplified block diagram of another system 200 for producing base oil stocks from a light hydrocarbon stream, in accordance with examples. Like numbered items are as described with respect to FIG. 1(A). In this example, the oligomerization feed stream 110 may be processed to remove carbon monoxide (CO). This may be performed in a catalytic reactor 160 with an oxygen or hydrogen stream 162, involving the use of a fixed bed reactor for selective CO conversion, as described with respect to the examples. The conditions for such selective conversion of CO may be between 25-400 C, or between 50-250 C, and pressure between 50 and 500 psig. Optionally an adsorption process such as Pressure Swing Adsorption (PSA) maybe used. Additionally, an adsorbent filled adsorption bed may be used for the removal of trace amount of CO. After the removal of the CO, the oligomerization feed stream 110 may be provided to the oligomerization reactor 112. Although not shown in FIG. 2, a dimerization reactor, or an alkylation reactor may be used to upgrade the oligomers. In some examples, other products may be produced.

Figure 3:
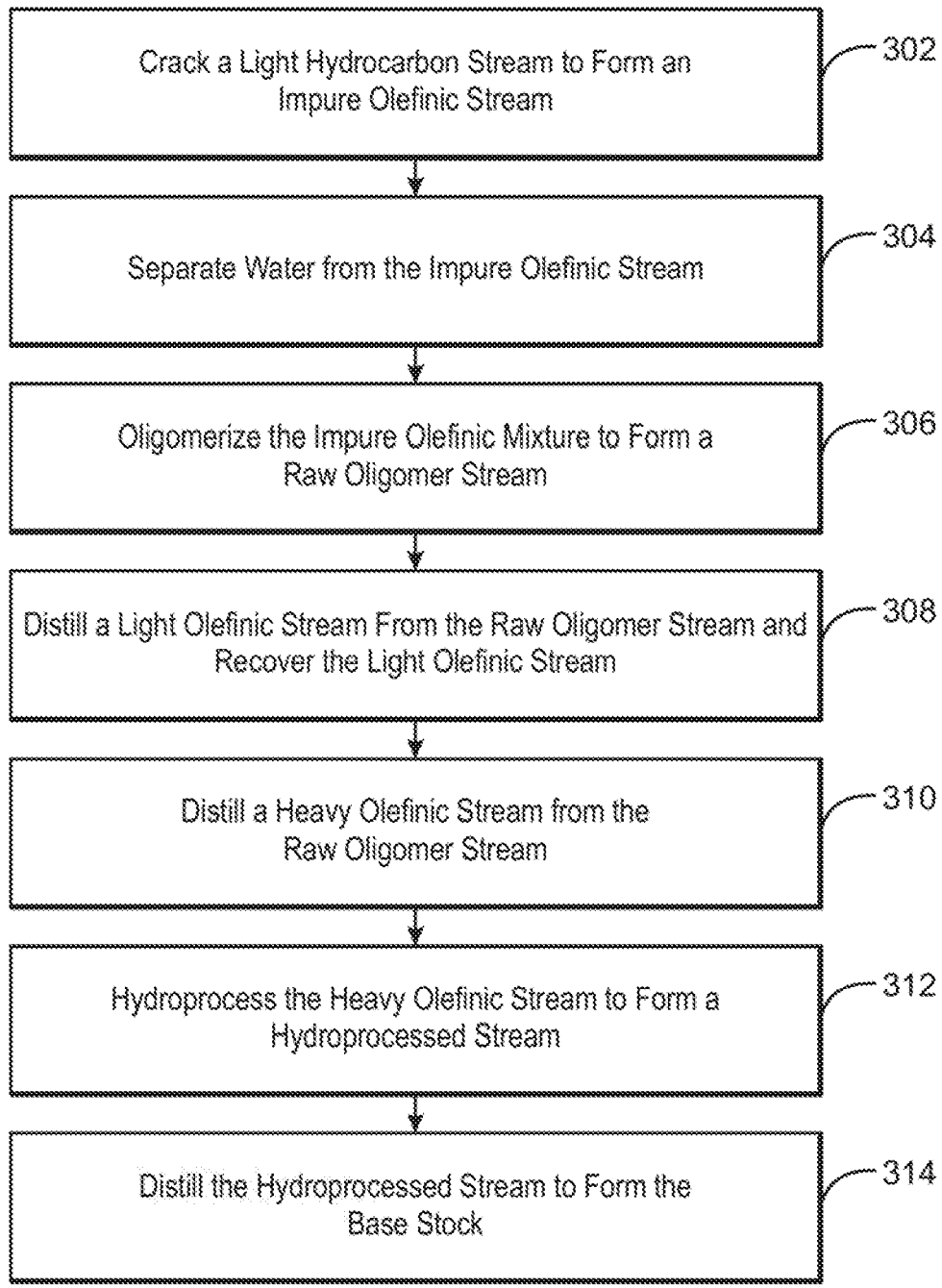
FIG. 3 is a process flow diagram of a method for producing base oil stocks from a light feedstock, in accordance with examples.

FIG. 3 is a process flow diagram of a method 300 for producing base oil stocks from a steam cracking process, in accordance with examples. The method 300 begins at block 302, with the cracking of a light hydrocarbon stream to form an impure olefinic mixture. Naphtha, steam cracking gas oil (SCGO), or tar, among others, may be separated from the impure olefinic mixture, for example, in a quench tower. Further, hydrogen sulfide, carbon dioxide, or both, may be separated from the raw product stream, for example, using a caustic tower or an amine separator.

At block 304, an oligomerization feed stream may be recovered from the impure ethylene mixture. This may be performed by passing the impure olefinic mixture stream through a condenser, or other separator, to remove water from the impure olefinic stream. Other actions may be performed for the purification, for example, passing the output stream from the condenser through a carbon monoxide oxidation system to remove carbon monoxide.

At block 306, the oligomerization feed stream may be oligomerized to form a raw oligomer stream. As described herein, this may be performed by contacting the oligomerization feed stream with a homogeneous catalyst to form the raw oligomer stream, wherein the raw oligomer stream has a substantial concentration of linear alpha olefins.

At block 308, a light olefinic stream is distilled from the raw oligomer stream, and processed to recover light olefins. As described herein, the light olefins may include linear alpha-olefins having about four to twenty carbon atoms. An olefinic stream may not include 100% olefinic compounds, but may include other compounds, such as paraffinic compounds, that have a similar boiling point to the olefinic compounds.

At block 310, a heavy olefinic stream is distilled from the intermediate stream. At block 312, the heavy olefinic stream is hydro-processed to form a hydro-processed stream. In the hydro-processing, the heavy olefinic stream may be hydrodemetallated to remove any traces of catalyst remaining from the oligomerization. The heavy olefinic stream may then be hydrocracked to form lower molecular weight compounds, for example, having a broader distribution. The heavy olefinic stream may be hydroisomerized to form a distribution of different isomers. Further, the heavy olefinic stream may be finished to decrease unsaturated and aromatic compounds in the hydro-processed stream.

At block 314, the hydro-processed stream is distilled to form the base oil stock. Distilling the hydro-processed stream may include separating a distillate stream, a naphtha stream, or both from the hydro-processed stream. These streams may be used as product streams and provided to other processes. Further, distilling the hydro-processed stream may include forming a heavy neutral oil stock stream, a medium neutral oil stock stream, or a light neutral oil stock stream, or any combinations thereof.

EXAMPLES

Example 1: Composition of Oligomerization Feed Stream

An example of the weight and volumetric composition of an oligomerization feed stream formed in the steam cracking of ethane, after separation with a primary fractionator, a caustic tower, and a drier, is shown in Table 1.

TABLE 1

Oligomerization feed stream composition after simple separation

| | Volume (%) |
|---|---|
| Hydrogen | 44.2 |
| Methane | 6.37 |
| Acetylene | 1.19 |
| Ethylene | 36.4 |
| Ethane | 11.4 |
| Propylene | 0.48 |
| Carbon Monoxide | 0.03 |

Example 2: Carbon Monoxide Removal from Impure Olefin Stream

Although the catalysts described herein may convert impure ethylene to linear alpha olefins and Group III base oil stock in the presence of carbon monoxide, the rate may be lower. In an example, a portion, or all, of the CO in the impure feed stream may be removed, as described with respect to FIG. 2. For example, the CO may be removed from the feed stream by adsorption onto a fixed bed pressure swing adsorption system (PSA) or catalytically, by selective hydrogenation or oxidation.

The selective hydrogenation of carbon monoxide was tested over a $Rh/Ag/TiO_2$ catalyst at 10 WHSV and 50 psig of 50% H2, 49% C2=, 0.9% C3=, and 0.12% CO. At 100° C., the carbon monoxide conversion was 24% with less than 1% conversion of ethylene and propylene to ethane and propane, respectively. Increasing temperature significantly increased carbon monoxide conversion, but also showed appreciable ethylene to ethane conversion and propylene conversion, which was undesired.

Figure 4:
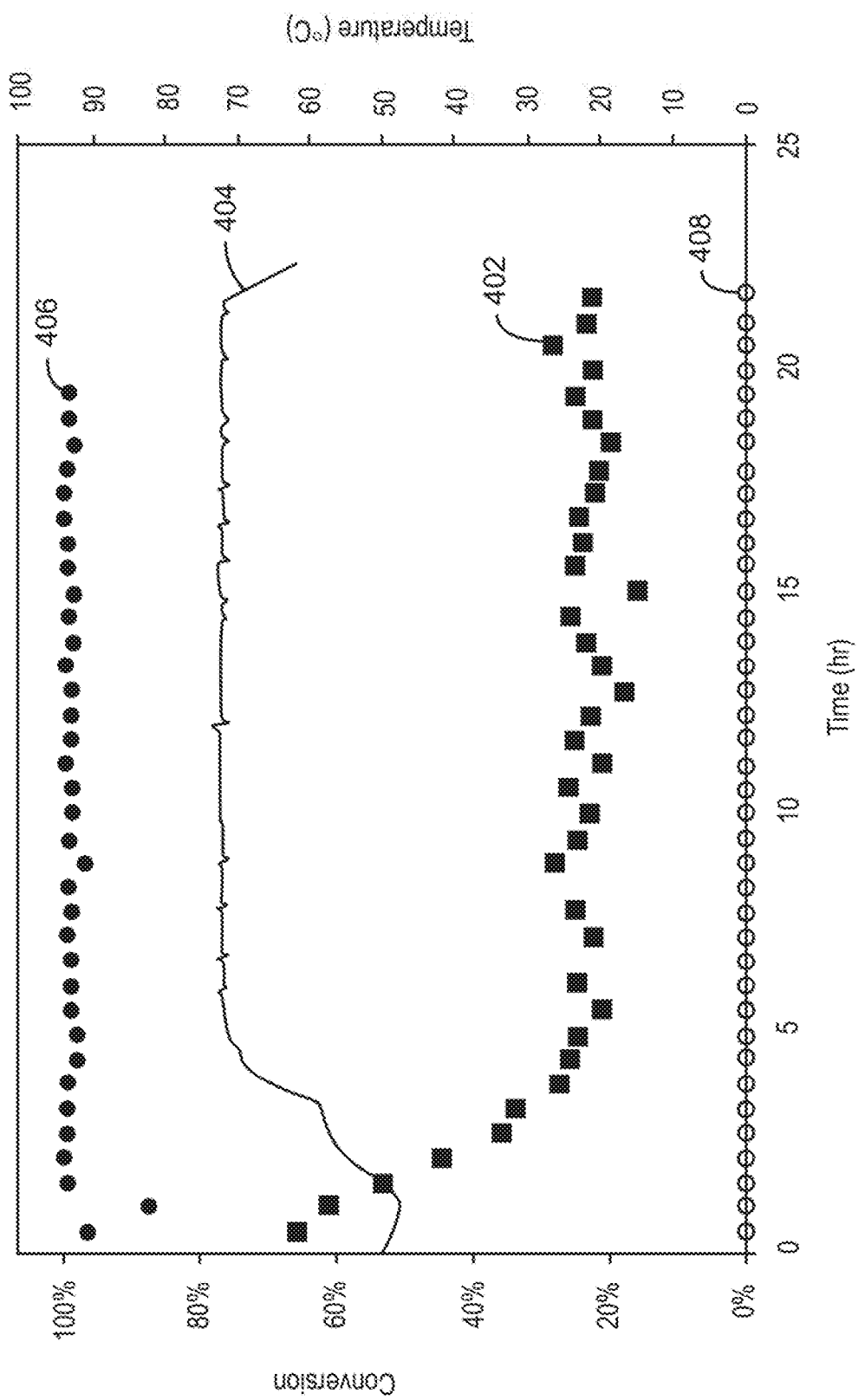
FIG. 4 is a plot showing the selective hydrogenation of carbon monoxide, in accordance with examples.
Figure 5A:
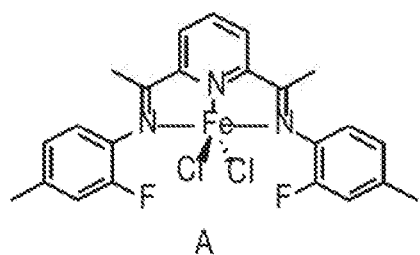
FIGS. 5(A)-5(F) are drawings of different homogeneous catalysts that can be used for oligomerization, in accordance with examples.
Figure 5B:
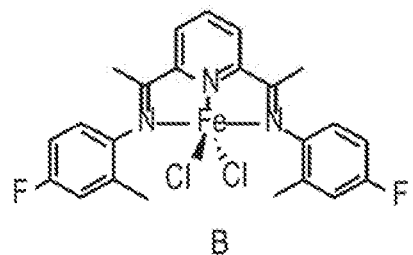
Figure 5C:
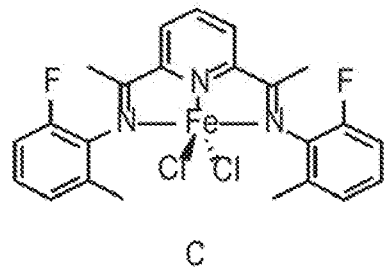
Figure 5D:
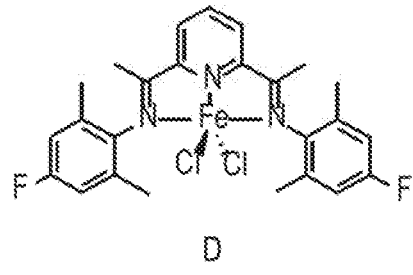
Figure 5E:
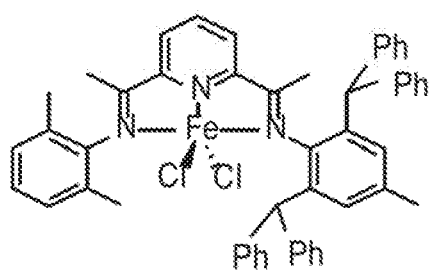
Figure 5F:
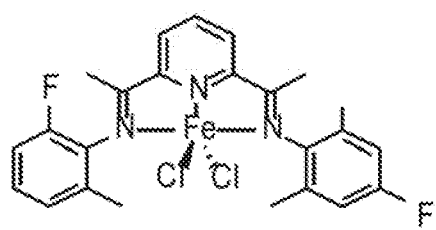

FIG. 4 is a plot 400 showing the selective hydrogenation of carbon monoxide, in accordance with examples. The selective oxidation of carbon monoxide was tested over an Au/Al2O3 catalyst at 10 WHSV and 50 psig of 48% H2, 47% C2=, 0.8% C3=, 0.12% CO, 0.1% O2, 5% N2, and 3% H2O. FIG. 4 is a plot showing the conversion rate 402 of selective oxidation of carbon monoxide to carbon dioxide, in accordance with examples. The initial activity as high as 60% conversion rate 402 of carbon monoxide at 70° C., shown as temperature 404. The high initial conversion rate 402 corresponds to a high oxygen usage rate 406. The oxygen usage rate 406 levels as the conversion rate 402 drops. The conversion rate 402 levels at a constant activity of about 25% conversion of carbon monoxide with less than about a 1% conversion rate 408 of ethane. The presence of water greatly increases the activity for carbon monoxide oxidation.

Example 3: Impure Olefin Stream to Shultz-Flory Molecular Distribution for LAO and Base Oil Stock Production FIGS. 5(A) to 5(E) are drawings of different homogeneous catalysts that can be used for oligomerization and dimerization processes, in accordance with examples. The capability of the homogeneous catalysts to oligomerize the impure olefinic stream to higher molecular weight products was determined by testing the material in a batch reactor. As described herein, the feed stream may include ethylene, propylene, hydrogen, methane, ethane, propane, acetylene, and carbon monoxide, among others.

The tests of the catalysts in the oligomerization process were performed in a 500 milliliter (mL) autoclave. 100 mL toluene solution containing 20 micromoles (μmol) catalyst and 4000 μmol MAO activator was charged to the autoclave. Then a predetermined amount of $N_2$, a mixture of $H_2$ and $N_2$, or a mixture with other gases, as described with respect to Tables 1-3, was charged into the autoclave to bring the autoclave to a preset pressure. The autoclave was then heated to 50° C. before ethylene was introduced. The reaction was exothermic and ethylene addition was controlled to keep the temperature below about 120° C. and a final total pressure of about 400 psi. The oligomerization reaction was allowed to proceed for approximately 30 minutes.

The autoclave was then cooled to room temperature and overhead gas pressure was released via opening of a valve. The reaction product, in the form of a solution (suspension) was then recovered. The solution was quenched with an aqueous HCl solution, and the aqueous phase containing Fe and Al was discarded. The reaction product was analyzed via gas chromatography (GC) and nuclear magnetic resonance (NMR) techniques.

The gas chromatography analysis for ethylene oligomers was performed using a method that enabled coverage up to C30. The column was 30 m long, with an inner diameter of 0.32 millimeters and a packing of 0.25 μm, available as a HP-5 column from Agilent. The carrier gas was nitrogen. The injector was held at a temperature of 150° C. and 10 psi. A 50 to 1 split ratio was used with a 121 mL per minute (mL/min) total flow rate and an injection size of 1-5 μL. The column oven was set to a 50° C. initial temp with a 10° C./min ramp rate to a 320° C. final temperature. It was held at the 320° C. temperature for 8 minutes giving a total run time of 35 minutes. The detector was a flame ionization detector held at 300° C., using a 30 mL/min flow of hydrogen, a 250 mL/min flow of air, and a 25 mL/min makeup stream of nitrogen. The gas chromatography analysis for dimerization or alkylation products was performed using a high temperature method to enable coverage up to C100. The column was 6 m long, with an inner diameter of 0.53 millimeters and a packing of 0.15 μm, available as a MXT-1 SimDist column from Restek company of State College, Pa. The carrier gas was nitrogen. The injector was held at a temperature of 300° C. and 0.9 psi. A 15 to 1 split ratio was used with a 27.4 mL per minute (mL/min) total flow rate and an injection size of 1 μL. The column oven was set to an 80° C. initial temp with a 15° C./min ramp rate to a 400° C. final temperature. It was held at the 400° C. temperature for 15 minutes giving a total run time of 36.3 minutes. The detector was a flame ionization detector held at 300° C., using a 40 mL/min flow of hydrogen, a 200 mL/min flow of air, and a 45 mL/min makeup stream of nitrogen.

The C-13 NMR analysis was performed using a Bruker 400 MHz Advance III to spectrophotometer. The samples were dissolved in chloroform-D ($CDCl_3$) or toluene-D8 in a 5 mm NMR tube at concentrations of between 10 to 15 wt. % prior to being inserted into the spectrophotometer. The C-13 NMR data was collected at room temperature (20° C.). The spectra were acquired with time averaging to provide a signal to noise level adequate to measure the signals of interest. Prior to data analysis, spectra were referenced by setting the chemical shift of the $CDCl_3$ solvent signal to 77.0 ppm.

H-1 NMR data was collected at room temperature. The data was recorded using a maximum pulse width of 45 degree, 8 seconds between pulses and signal averaging of 120 transients.

The analyses confirmed that the products were mostly linear alpha-olefins (LAOS) having Schulz-Flory (S-F) distributions. The S-F distribution constant, a, was determined by an average of the molar ratios of C16/C14; C14/C12; and C12/C10 in the product, as determined by gas chromatography.

The information in Table 2 shows the basic comparison between oligomerizations performed using catalysts A-D. For these runs, the reaction conditions included about 200 psi of ethylene, about 200 psi of hydrogen, a reaction temperature of about 80° C. to 100° C., 100 mL of toluene (as a catalyst solvent), 20 μmol of catalyst, and a ratio of 200 mol/mol of activator (co-catalyst) to catalyst, such as the MAO activators described herein.

TABLE 2

Comparison of oligomerization by catalyst A-D

| Example | Catalyst | Alpha Value | % Linear Alpha Olefin* | % Branched Olefins* | % Linear Paraffin* |
|---|---|---|---|---|---|
| X1 | A | 0.339 | 66.6 | 22.1 | 1.6 |
| X2 | B | 0.667 | 92.9 | 5.2 | 1.2 |
| X3 | C | 0.828 | 96.0 | 1.1 | 2.4 |
| X4 | D | 0.947 | 34.5 | 0.2 | 64.7 |

*Presented in C12 fraction as determined by gas chromatography and mass spectrometry These results indicate that the paraffin/olefin ratio and S-F distribution may be changed by designing the ligand of the Fe-complex. Further, the oligomerization is tolerant of large amount of $H_2$ and a variety of solvents.

Figure 6:
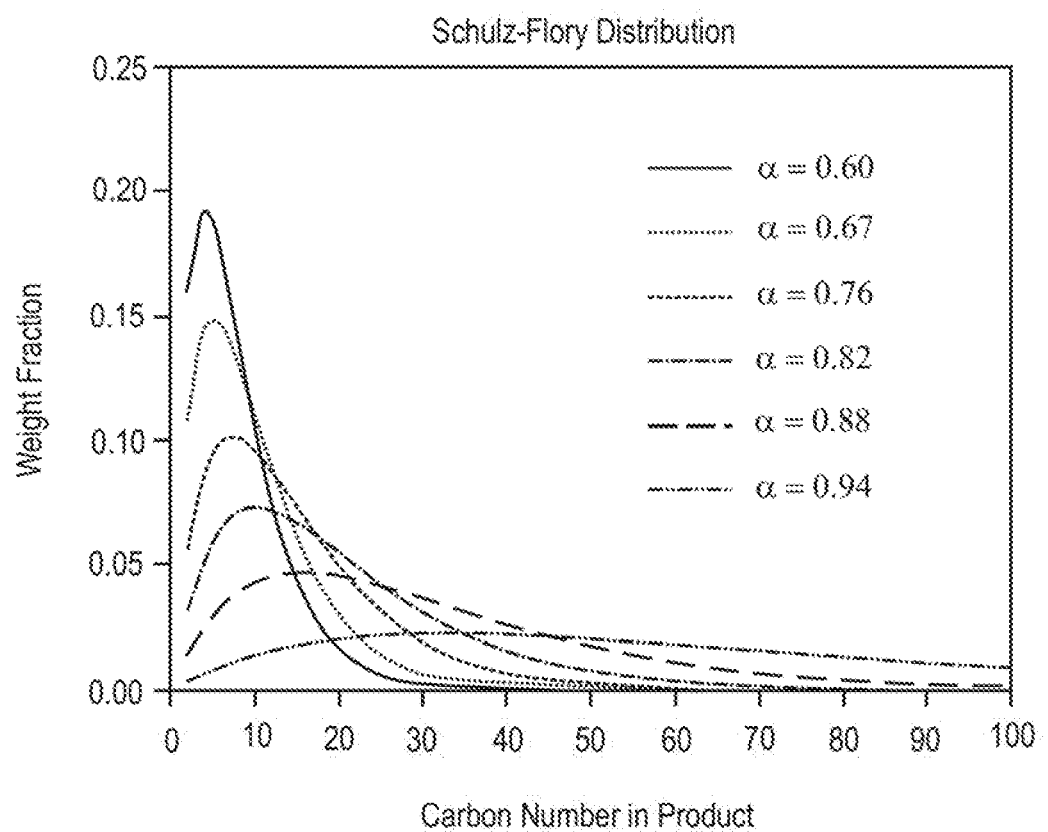
FIG. 6 is a plot of the Schultz-Flory distribution of a product that includes different carbon numbers, in accordance with examples.

FIG. 6 is a plot 600 of the Schultz-Flory distribution of a product that includes different carbon numbers, in accordance with examples. The weight fraction of the Schulz-Flory product distribution with experimentally obtained a values may be plotted against the carbon number in the product. The same data can be recast to show lumped fraction distribution as a function of a value.

Figure 7:
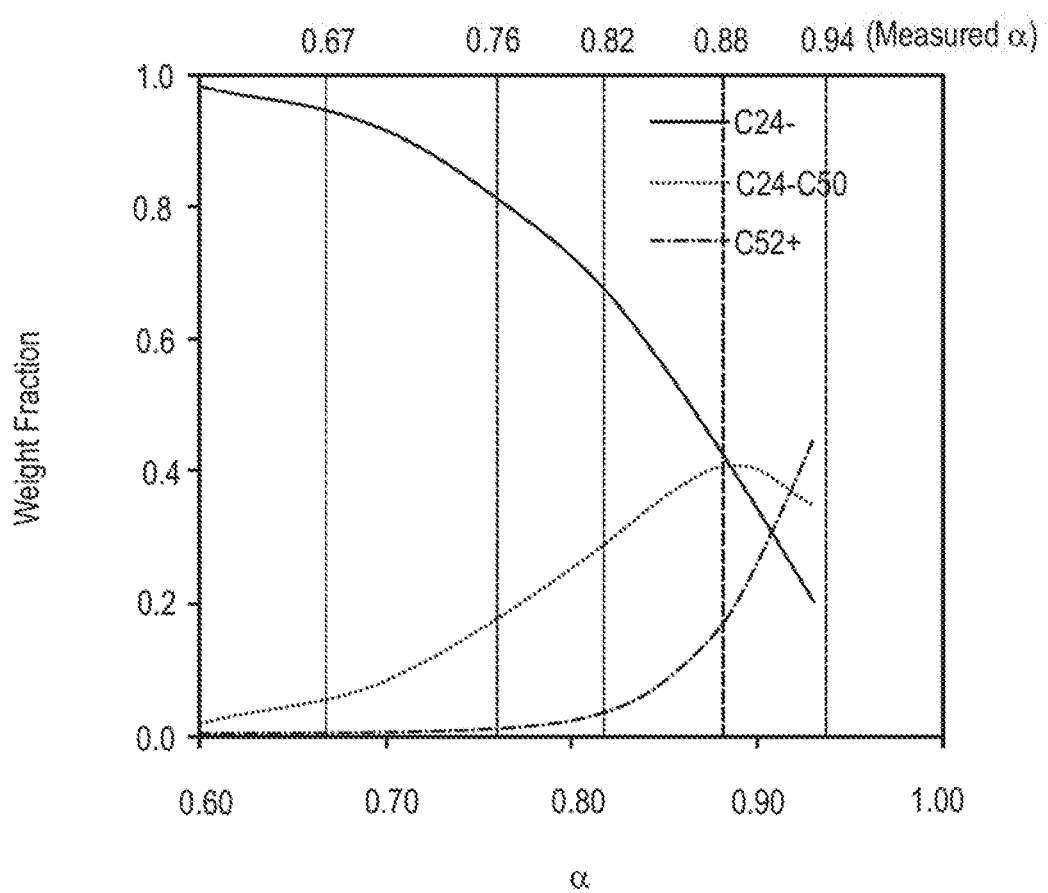
FIG. 7 is a plot of the effect of the change in carbon number composition on a weight fraction of a product as the Schultz-Flory distribution changes, in accordance with examples.

FIG. 7 is a plot 700 of the effect of the change in carbon number composition on a weight fraction of a product as the Schultz-Flory distribution changes, in accordance with examples. The plot 700 shows C24-, C24-050, and C52+ fractions as a function of a value, indicating that the lube molecule range C24-050 has a maximum value of about 40 wt. % at an a value around 0.88. This further illustrates that the lube/LAO split may be effectively controlled by using different catalysts that offer different a values.

Example 4: Effect of Hydrogen Impurity on an Oligomerization Using an Fe-PBI Catalyst Catalyst B, shown in FIG. 5(B), was chosen to determine the effects of changing the ratio of hydrogen to nitrogen on the reaction. The procedure was as described with respect to Example 3. The results are shown in Table 3. For these runs, the reaction conditions included about 200 psi of ethylene, about 200 psi of hydrogen or a mixture of hydrogen and nitrogen, a reaction temperature of about 80° C. to 100° C., 100 mL of toluene, 20 μmol of catalyst, and a ratio of 200 mol/mol of activator (co-catalyst) to catalyst. Examples X2, X5, and X6 show that the catalyst has a similar product distribution with only a small paraffin concentration (mostly LAO) across an order of magnitude change in hydrogen concentration. Thus, the hydrogen impurity does not greatly affect the product distribution across an Fe-PBI catalyst.

TABLE 3

Comparison of oligomerization under changing ratios of hydrogen and nitrogen using catalyst B

| Example | Catalyst | H2, psi | Alpha Value (α) | % Linear Paraffin* |
|---------|----------|---------|-----------------|---------------------|
| X2 | B | 200 | 0.667 | 1.2 |
| X5 | B | 20 | 0.664 | 0.7 |
| X6 | B | 1.5 | 0.698 | 1.1 |

*Presented in C12 fraction as determined by gas chromatography and mass spectrometry

Example 5: Effect of CO Impurity on an Oligomerization Using an Fe-PBI Catalyst Catalyst E, shown in FIG. 5(E) was tested using the procedure in Example 3 with and without carbon monoxide poison in the feed at constant ethylene partial pressure, with the results shown in Table 4. The run used 24.6 μmol of catalyst with a 500 to 1, mol to mol ratio of MAO to catalyst. The gas mixture that was blended with hydrogen and ethylene contained 82.7% C2=, 10.6% C2, 6.1% CH4, 0.5% C3=, and 0.1% CO. When blended 50/50 with hydrogen, the final concentration of CO was 0.05%. The rate was determined by the moles of ethylene converted to product per moles of catalyst. The relative rate is determined compared to the rate with just ethylene/hydrogen in the feed. The rate decreases by an order of magnitude when carbon monoxide in the feed.

However, for catalyst E, carbon monoxide does not completely terminate the oligomerization reaction despite the decrease in rate. In contrast, other iron catalysts tested were not active when CO was present.

TABLE 4

Effects of CO on oligomerization

| Example | C2= (psig) | Mix (psig) | H2 (psig) | CO (ppm) | Relative Rate |
|---------|-----------|-----------|-----------|----------|---------------|
| X7 | 100 | 0 | 100 | 0 | 100% |
| X8 | 50 | 50 | 100 | 500 | 7.1% |

Example 6: Effects of Carbon Monoxide and Acetylene Impurities on Oligomerization Catalyst E was tested using the procedure in Example 3 with both carbon monoxide and acetylene poison in the feed at constant ethylene partial pressure. The run contained 24.6 μmol of catalyst with a 500 to 1, mol to mol ratio of MAO to catalyst. The gas mixture that was eventually blended with hydrogen and ethylene contained 81.7% C2=, 10.5% C2, 6.0% CH4, 1.2% Acetylene, 0.5% C3=, and 0.1% CO. The relative rate of the CO and acetylene containing mixture to that of the mixture just containing CO is 90.3%. Thus, acetylene not only does not inhibit the activity of the catalyst, but also incorporates into the product as observed by FT-IR microspectroscopy.

Figure 8:
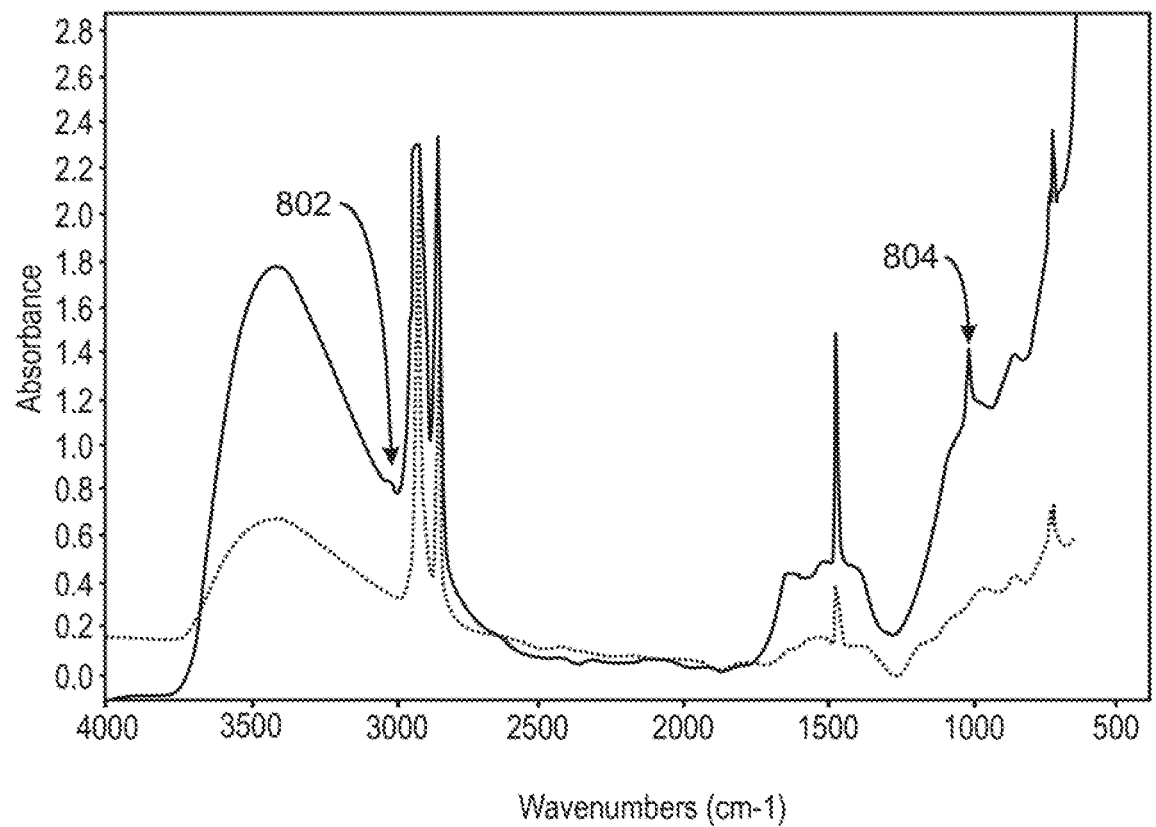
FIG. 8 is a plot of an IR spectrum showing the incorporation of acetylene into the product, in accordance with examples.

FIG. 8 is a plot 800 of an IR spectrum showing the incorporation of acetylene into the product, in accordance with examples. The incorporation of acetylene into the product was confirmed by peaks corresponding to trans-polyacetylene at 3015 wavenumbers 802 and 1010 wavenumbers 804.

Figure 9:
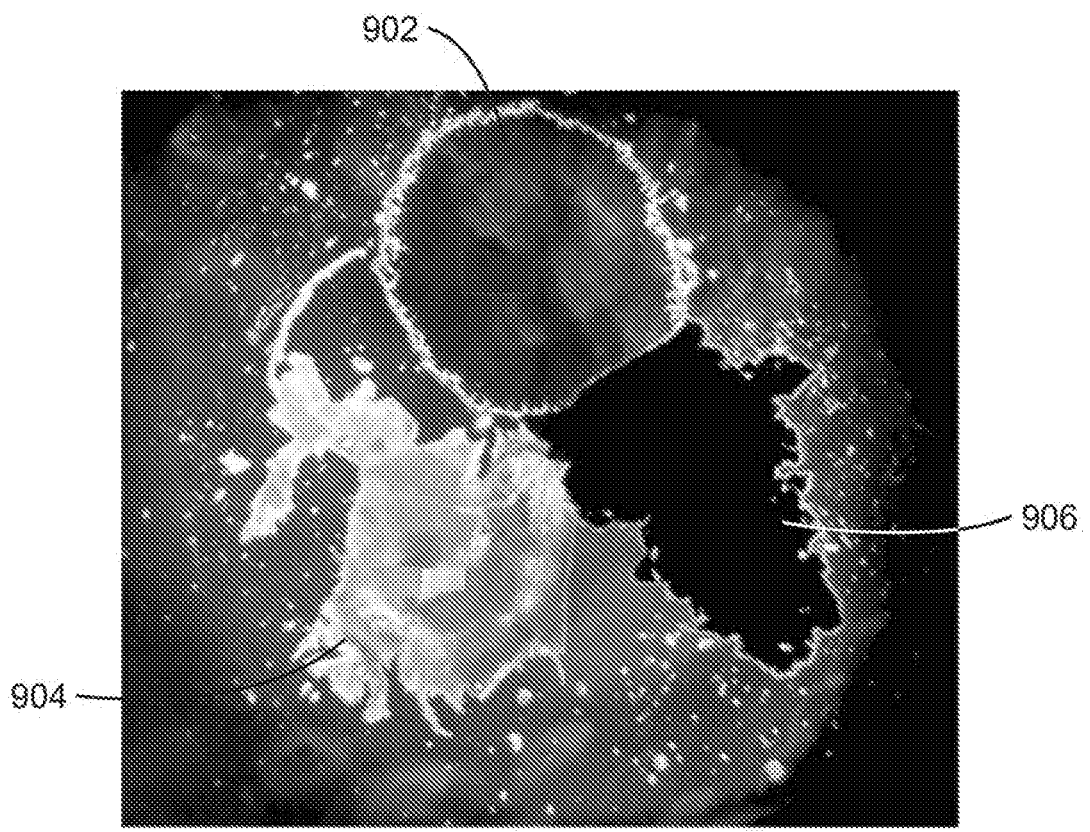
FIG. 9 is an infrared micrograph, showing the presence of polyacetylene in a product, in accordance with examples.

FIG. 9 is an infrared micrograph 900, showing the presence of polyacetylene in a product, in accordance with examples. In the micrograph, regions of KBr 902, polyethylene 904, and poly(acetylene) 906 are visible.

Figure 10:
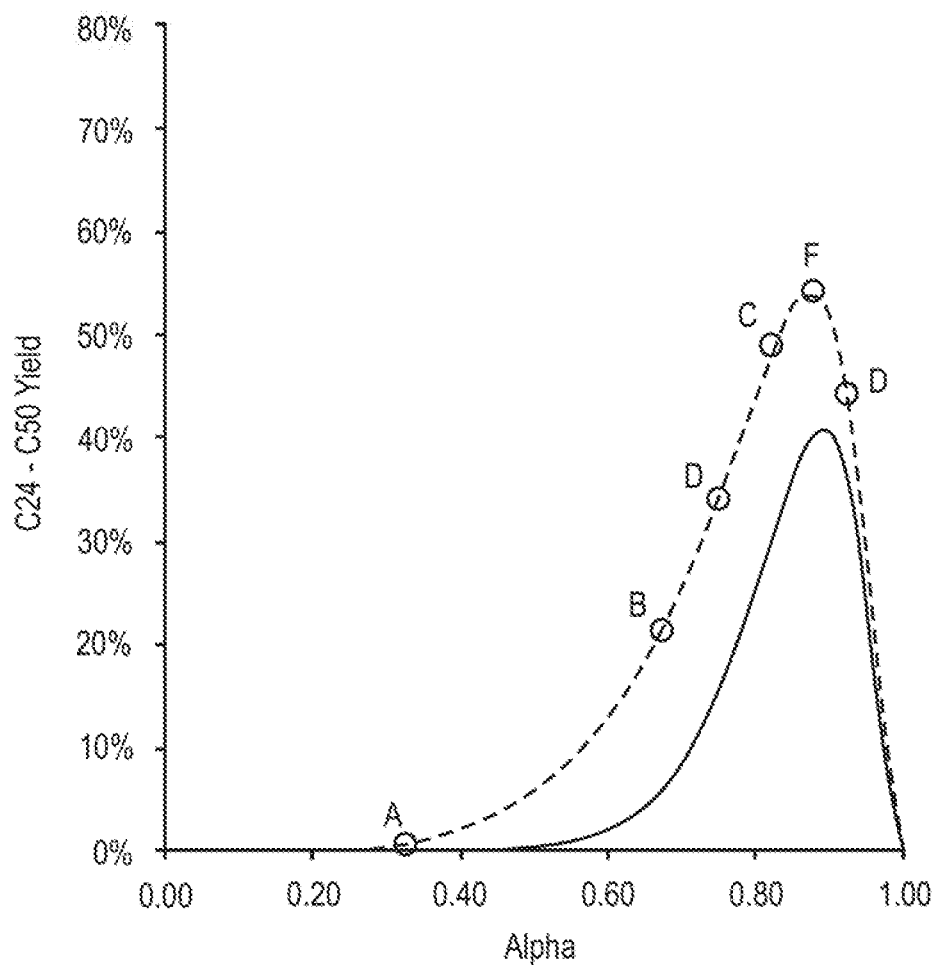
FIG. 10 is a plot comparing ligand structure to the yield of higher carbon number compounds, in accordance with examples.

Example 7: Effect of Ligands on Co-Production of Group III+ Base Oil Stock and LAO with Impure Ethylene The oligomerization of 50/50 ethylene/hydrogen with various Fe-PBI catalysts was shown to provide a product slate that was adjustable by catalyst ligand modification at 400 psig total pressure and 80 C. The ability to tune MW selectivity with the catalyst allows the preferred amount of LAO and Group III+ base oil stock, such as the yield of C24-C50 compounds, to be produced that maximizes flexibility and profitability. FIG. 10 is a plot 1000 comparing ligand structure to the yield of higher carbon number compounds, in accordance with examples. The individual data points are labeled with A to F corresponding to the catalyst from FIGS. 5(A) to 5(F).

Figure 11A:
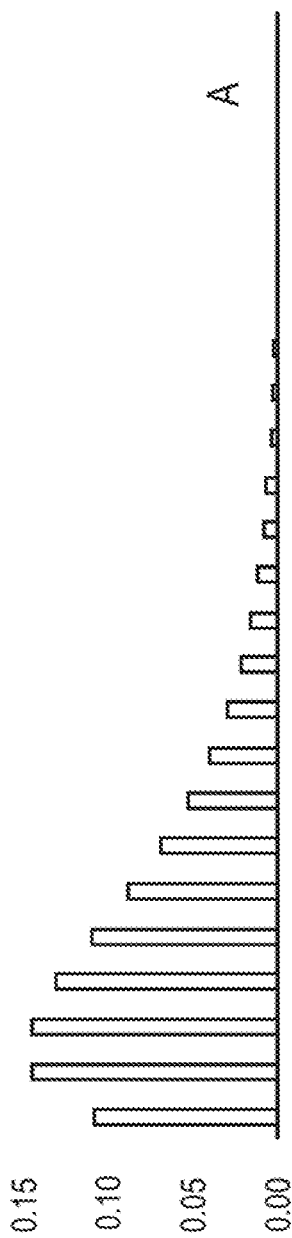
FIGS. 11(A)-11(C) are three plots showing the ability to tune the molecular weight distribution of the products using ligand modification, in accordance with examples.
Figure 11B:
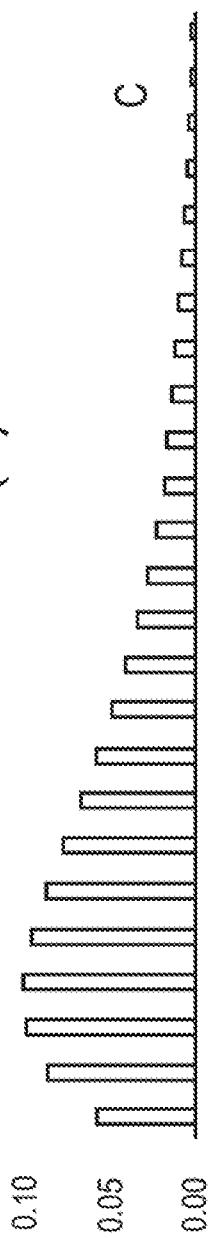
Figure 11C:
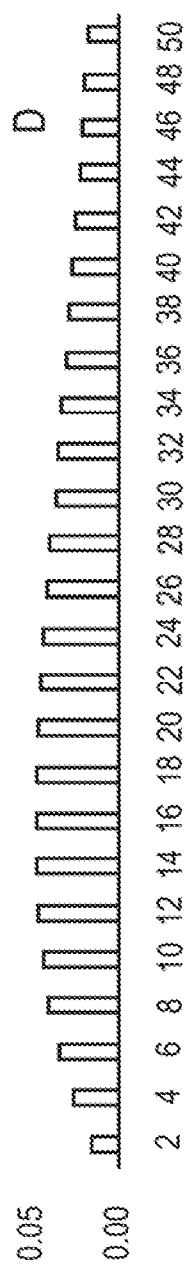

FIGS. 11(A) to 11(C) are comparisons of three plots showing the ability to tune the molecular weight distribution of the products using ligand modification, in accordance with examples. Each of the figures are labelled with the corresponding catalysts, from FIGS. 5(A), 5(C), and 5(D), used to produce the sample.

Embodiments

The embodiments of the present techniques include any combinations of the examples in the following numbered paragraphs.

1. A system for manufacturing a base oil stock from a light hydrocarbon stream, including a cracker configured to form a raw hydrocarbon stream from the light hydrocarbon stream, a separator configured to separate a raw olefinic stream from the raw hydrocarbon stream, and an oligomerization reactor configured to increase a number of carbon atoms in molecules of the raw olefinic stream forming a raw oligomer stream. The system also includes a distillation column configured to separate the raw oligomer stream into a light olefinic stream, an intermediate olefinic stream, and a heavy olefinic stream, wherein the light olefinic stream is provided to another separator for the isolation of light linear alpha-olefins. A hydro-processing reactor is configured to hydro-process the heavy olefinic stream to form a hydro-processed stream, and a product distillation column is configured to separate the hydro-processed stream to form the base oil stock.

2. The system of Embodiment 1, including a dimerization reactor configured to dimerize the intermediate olefinic stream and return a dimerized stream to the distillation column.

3. The system of either of Embodiments 1 or 2, including an alkylation reactor configured to alkylate the intermediate olefinic stream and provide a raw alkylated stream to an alkylation distillation column.

4. The system of any of Embodiments 1 to 3, wherein the alkylation distillation column is configured to separate an unreacted olefin stream from the raw alkylated stream and return the unreacted olefin stream to the alkylation reactor.

5. The system of any of Embodiments 1 to 4, wherein the alkylation distillation column is configured to separate an alkylated stream from the raw alkylated stream and provide the alkylated stream to the hydro-processing reactor.

6. The system of any of Embodiments 1 to 5, wherein the separator includes a primary fractionator configured to remove tar and steam cracker gas oil from the raw hydrocarbon stream, a caustic tower configured to remove hydrogen sulfide and carbon dioxide from the raw hydrocarbon stream, and a dryer configured to remove water from the raw hydrocarbon stream.

7. The system of any of Embodiments 1 to 6, wherein the oligomerization reactor is configured to use a homogeneous catalyst.

8. The system of Embodiment 7, wherein the homogeneous catalyst includes an iron (II) pyridine-bis-imine (Fe-PBI) catalyst including a structure of,

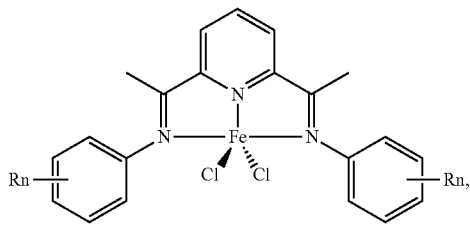

wherein Rn includes one, two, or three substituents, and wherein the substituents include $CH_3$, F, or both.

9. The system of any of Embodiments 1 to 8, wherein the hydro-processing reactor includes a demetallation unit.

10. The system of any of Embodiments 1 to 9, wherein the hydro-processing reactor includes a hydrocracking unit.

11. The system of any of Embodiments 1 to 10, wherein the hydro-processing reactor includes a hydroisomerization unit.

12. The system of any of Embodiments 1 to 11, wherein the distillation column is configured to separate the hydro-processed stream into a distillate stream including naphtha, a heavy neutral stream, a medium neutral stream, and a light neutral stream.

13. A method for manufacturing a base oil stock from a light hydrocarbon stream, including cracking the light hydrocarbon stream to form an impure olefinic stream, separating water from the impure olefinic stream, and oligomerizing the impure olefinic stream to form a raw oligomer stream. The method also includes distilling a light olefinic stream from the raw oligomer stream and recovering alpha olefins from the light olefinic stream. A heavy olefinic stream is distilled from the raw oligomer stream, and the heavy olefinic stream is hydro-processed to form a hydro-processed stream. The hydro-processed stream is distilled to form the base oil stock.

14. The method of Embodiment 13, including distilling an intermediate olefinic stream from the raw oligomer stream.

15. The method of either of Embodiments 13 or 14, including dimerizing the intermediate olefinic stream to form a dimerized stream, and distilling the dimerized stream with the raw oligomer stream.

16. The method of any of Embodiments 13 to 15, including alkylating the intermediate olefinic stream to form an alkylated stream, distilling the alkylated stream to form a lights stream and a heavies stream, combining the lights stream with the intermediate olefinic stream to form a combined stream, and alkylating the combined stream.

17. The method of Embodiment 16, including hydro-processing the heavies stream.

18. The method of any of Embodiments 13 to 17, wherein oligomerizing the impure olefinic stream includes contacting the impure olefinic stream with a homogeneous catalyst including an iron (II) pyridine-bis-imine.

19. The method of any of Embodiments 13 to 18, including separating an unreacted ethylene stream from the raw oligomer stream, and oligomerizing the unreacted ethylene stream with the impure olefinic stream.

20. The method of any of Embodiments 13 to 19, wherein hydro-processing the heavy olefinic stream includes hydrocracking the heavy olefinic stream.

21. The method any of Embodiments 13 to 20, wherein hydro-processing the heavy olefinic stream includes hydroisomerizing the heavy olefinic stream.

22. The method of any of Embodiments 13 to 21, wherein distilling the hydro-processed stream includes separating a distillate stream, a naphtha stream, or both from the hydro-processed stream.

23. The method of any Embodiments 13 to 22, wherein distilling the hydro-processed stream includes forming a heavy neutral oil stock stream, a medium neutral oil stock stream, or a light neutral oil stock stream, or any combinations thereof.

24. A system for manufacturing a base oil stock from a light hydrocarbon stream, including a steam cracker to form an impure olefinic stream from the light hydrocarbon stream, a separator configured to remove naphtha, water, steam cracker gas oil (SCGO), and tar from the impure olefinic stream, and an oligomerization reactor configured to convert the impure olefinic stream to a higher molecular weight stream by contacting the impure olefinic stream with a homogeneous catalyst. The system also includes a distillation column configured to recover a light olefinic stream, wherein the distillation column is configured to separate an intermediate olefinic stream from the higher molecular weight stream and send the intermediate olefinic stream to a dimerization reactor or an alkylation reactor. The distillation column is configured to separate a heavy olefinic stream from the higher molecular weight stream. A hydro-processing reactor is configured to demetallate the heavy olefinic stream, to crack the heavy olefinic stream, to form isomers in the heavy olefinic stream, or to hydrogenate olefinic bonds in the heavy olefinic stream, or any combinations thereof. A product distillation column is included to separate the isomers in the heavy olefinic stream to form a number of base oil stock streams.

25. The system of Embodiment 24, wherein the dimerization reactor is configured to dimerize the intermediate olefinic stream to form a dimerized stream and return the dimerized stream to the distillation column.

26. The system of either of Embodiments 24 or 25, wherein the alkylation reactor is configured to alkylate the intermediate olefinic stream to form an alkylated stream.

27. The system of any of Embodiments 24 to 26, including an alkylation distillation column configured to separate the alkylated stream into a reacted stream and an unreacted stream, and return the unreacted stream to the alkylation reactor.

28. The system of any of Embodiments 24 to 27, wherein the homogeneous catalyst includes an iron (II) pyridine-bis-imine (Fe-PBI) compound including a structure of

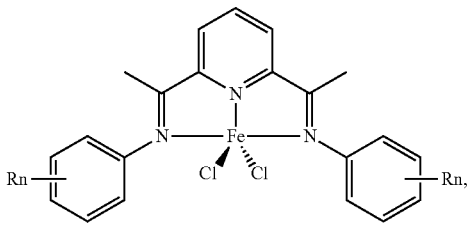

wherein Rn includes one, two, or three substituents, and wherein the substituents include $CH_3$, F, or both.

While the present techniques may be susceptible to various modifications and alternative forms, the embodiments discussed above have been shown only by way of example. However, it should again be understood that the techniques is not intended to be limited to the particular examples disclosed herein. Indeed, the present techniques include all alternatives, modifications, and equivalents falling within the true spirit and scope of the appended claims.

The invention claimed is:

1. A system for manufacturing a base oil stock from a light hydrocarbon stream, comprising:
a cracker configured to form a raw hydrocarbon stream from the light hydrocarbon stream;
a separator configured to separate a raw olefinic stream from the raw hydrocarbon stream;
an oligomerization reactor configured to increase a number of carbon atoms in molecules of the raw olefinic stream forming a raw oligomer stream;
a distillation column configured to separate the raw oligomer stream into:
a light olefinic stream, wherein the light olefinic stream is provided to another separator for the isolation of light linear alpha-olefins;
an intermediate olefinic stream; and
a heavy olefinic stream;
a hydro-processing reactor configured to hydro-process the heavy olefinic stream to form a hydro-processed stream;
a product distillation column configured to separate the hydro-processed stream to form the base oil stock; and
a dimerization reactor configured to dimerize the intermediate olefinic stream and return a dimerized stream to the distillation column.

2. The system of claim 1, comprising an alkylation reactor configured to alkylate the intermediate olefinic stream and provide a raw alkylated stream to an alkylation distillation column.

3. The system of claim 2, wherein the alkylation distillation column is configured to separate an unreacted olefin stream from the raw alkylated stream and return the unreacted olefin stream to the alkylation reactor.

4. The system of claim 2, wherein the alkylation distillation column is configured to separate an alkylated stream from the raw alkylated stream and provide the alkylated stream to the hydro-processing reactor.

5. The system of claim 1, wherein the separator comprises:
a primary fractionator configured to remove tar and steam cracker gas oil from the raw hydrocarbon stream;
a caustic tower configured to remove hydrogen sulfide and carbon dioxide from the raw hydrocarbon stream; and
a dryer configured to remove water from the raw hydrocarbon stream.

6. The system of claim 1, wherein the oligomerization reactor is configured to use a homogeneous catalyst.

7. The system of claim 6, wherein the homogeneous catalyst comprises an iron (II) pyridine-bis-imine (Fe-PBI) catalyst comprising a structure of:

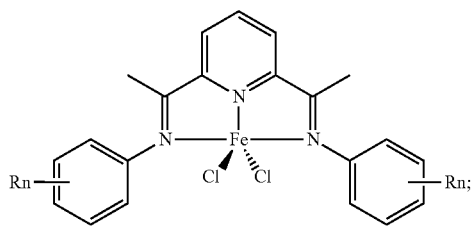

wherein Rn comprises one, two, or three substituents; and wherein the substituents comprise $CH_3$, F, or both.

8. The system of claim 1, wherein the hydro-processing reactor comprises a demetallation unit.

9. The system of claim 1, wherein the hydro-processing reactor comprises a hydrocracking unit.

10. The system of claim 1, wherein the hydro-processing reactor comprises a hydroisomerization unit.

11. The system of claim 1, wherein the product distillation column is configured to separate the hydro-processed stream into:
a distillate stream comprising naphtha;
a heavy neutral stream;
a medium neutral stream; and
a light neutral stream.

12. A system for manufacturing a base oil stock from a light hydrocarbon stream, comprising:
a steam cracker to form an impure olefinic stream from the light hydrocarbon stream;
a separator configured to remove naphtha, water, steam cracker gas oil (SCGO), and tar from the impure olefinic stream;
an oligomerization reactor configured to convert the impure olefinic stream to a higher molecular weight stream by contacting the impure olefinic stream with a homogeneous catalyst;
a distillation column configured to recover a light olefinic stream;
the distillation column configured to separate an intermediate olefinic stream from the higher molecular weight stream and send the intermediate olefinic stream to a dimerization reactor or an alkylation reactor;
the distillation column configured to separate a heavy olefinic stream from the higher molecular weight stream;
a hydro-processing reactor configured to demetallate the heavy olefinic stream, to crack the heavy olefinic stream, to form isomers in the heavy olefinic stream, or to hydrogenate olefinic bonds in the heavy olefinic stream, or any combinations thereof; and
a product distillation column to separate the isomers in the heavy olefinic stream to form a plurality of base oil stock streams.

13. The system of claim 12, wherein the dimerization reactor is configured to dimerize the intermediate olefinic stream to form a dimerized stream and return the dimerized stream to the distillation column.

14. The system of claim 12, wherein the alkylation reactor is configured to alkylate the intermediate olefinic stream to form an alkylated stream.

15. The system of claim 14, comprising an alkylation distillation column configured to separate the alkylated stream into a reacted stream and an unreacted stream, and return the unreacted stream to the alkylation reactor.

16. The system of claim 12, wherein the homogeneous catalyst comprises an iron (II) pyridine-bis-imine (Fe-PBI) compound comprising a structure of:

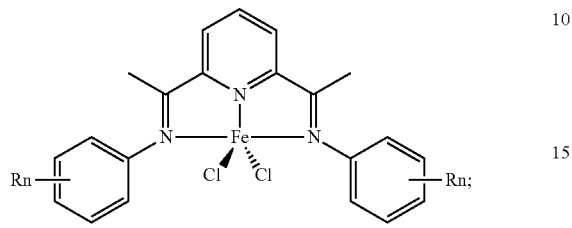

wherein Rn comprises one, two, or three substituents; and wherein the substituents comprise $CH_3$, F, or both.

* * * * *